United States Patent
Fudge et al.

(10) Patent No.: US 8,078,130 B2
(45) Date of Patent: *Dec. 13, 2011

(54) SYSTEMS AND METHODS FOR INTERFERENCE CANCELLATION

(75) Inventors: Gerald L. Fudge, Rockwall, TX (US); Ross E. Bland, Dallas, TX (US); Antone L. Kusmanoff, Greenville, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 470 days.

This patent is subject to a terminal disclaimer.

(21) Appl. No.: 12/317,486

(22) Filed: Dec. 23, 2008

(65) Prior Publication Data

US 2010/0159866 A1    Jun. 24, 2010

(51) Int. Cl.
*H04B 1/10* (2006.01)
(52) U.S. Cl. .......................... 455/295; 455/296; 455/307
(58) Field of Classification Search .................. None
See application file for complete search history.

(56) References Cited

U.S. PATENT DOCUMENTS

| | | |
|---|---|---|
| 3,894,219 A | 7/1975 | Weigel |
| 4,531,098 A | 7/1985 | Reed |
| 4,542,265 A | 9/1985 | Brady |
| 5,014,018 A | 5/1991 | Rodwell et al. |
| 5,061,934 A | 10/1991 | Brown et al. |
| 5,221,926 A | 6/1993 | Jackson |
| 5,454,007 A | 9/1995 | Dutta |
| 5,699,045 A | 12/1997 | Frederick et al. |
| 6,198,819 B1 | 3/2001 | Farrell et al. |
| 6,266,518 B1 | 7/2001 | Sorrells et al. |
| 6,373,418 B1 | 4/2002 | Abbey |
| 6,507,624 B1 | 1/2003 | Jachim et al. |
| 6,516,063 B1 | 2/2003 | Farrell et al. |
| 6,574,459 B1 | 6/2003 | Kaminski et al. |
| 6,661,362 B2 | 12/2003 | Brooks |
| 6,700,388 B1 | 3/2004 | Mayor et al. |
| 6,734,818 B2 | 5/2004 | Galton |
| 6,741,701 B1 | 5/2004 | Barak et al. |
| 6,784,814 B1 | 8/2004 | Nair et al. |
| 6,900,710 B2 | 5/2005 | Agoston et al. |
| 6,956,517 B1 | 10/2005 | Baker et al. |
| 7,091,894 B2 * | 8/2006 | Fudge et al. ................ 341/155 |
| 7,107,033 B2 | 9/2006 | Du Toit |
| 7,218,694 B2 * | 5/2007 | Kolze et al. .................. 375/346 |

(Continued)

FOREIGN PATENT DOCUMENTS

EP    1156590 A1    11/2001

(Continued)

OTHER PUBLICATIONS

Arthur, "Modern SAW-based pulse compression systems for radar applications, Part I: SAW matched filters," Electronics & Communication Engineering Journal, Dec. 1995, pp. 236-246.

(Continued)

*Primary Examiner* — Long Nguyen
(74) *Attorney, Agent, or Firm* — O'Keefe, Egan, Peterman & Enders LLP

(57) ABSTRACT

Systems and methods for interference cancellation in which a first signal having a first frequency may be cancelled with a second frequency having a second and different (e.g., lower) frequency by employing sampling to cancel the first signal with the separate signal at the sample instances.

24 Claims, 8 Drawing Sheets

U.S. PATENT DOCUMENTS

| | | | |
|---|---|---|---|
| 7,336,698 B2* | 2/2008 | Nuutinen et al. | 375/144 |
| 7,436,910 B2 | 10/2008 | Fudge et al. | |
| 7,436,911 B2 | 10/2008 | Fudge et al. | |
| 7,436,912 B2 | 10/2008 | Fudge et al. | |
| 2002/0114472 A1 | 8/2002 | Lee et al. | |
| 2002/0161300 A1 | 10/2002 | Hoff et al. | |
| 2003/0016762 A1 | 1/2003 | Martin et al. | |
| 2003/0054783 A1 | 3/2003 | Mason et al. | |
| 2003/0199286 A1 | 10/2003 | D du Toit | |
| 2005/0069046 A1 | 3/2005 | Tsui et al. | |
| 2007/0081617 A1 | 4/2007 | Fudge | |

FOREIGN PATENT DOCUMENTS

| | | |
|---|---|---|
| GB | 2296398 A | 6/1996 |
| WO | WO2004/032348 A1 | 4/2004 |

OTHER PUBLICATIONS

Arthur, "Modern SAW-based pulse compression systems for radar applications, Part II: Practical systems," Electronics & Communication Engineering Journal, Apr. 1996, pp. 57-78.

Brandl et al., "High Speed Signal Processing with Tapped Dispersive SAW based Delay Lines," University of Technology, Applied Electronics Laboratory, Vienna Austria, IEEE 2000, pp. 171-176.

Burke, "Ultra-Linear Chirp Generation Via VCO Tuning Predistortion," AIL Systems, Inc., Deer Park, New York, IEEE 1994 MTT-S Digest, pp. 957-960.

Gerard et al., "The Design and Applications of Highly Dispersive Acoustic Surface-Wave Filters," Invited Paper, IEEE Transactions on Microwave Theory and Techniques, vol. MTT-21, No. 4, Apr. 1973, pp. 176-186.

Ong et al., "Digital LPI Radar Detector," Naval Postgraduate School Thesis, Monterey, California, Mar. 2001, pp. 1-81.

Grant et al., "Recent Advances in Analog Signal Processing," IEEE 1990, IEEE Transactions on Aerospace and Electronic Systems, vol. 26, No. 5, Sep. 1990, pp. 818-849.

Li et al, "On the Use of a Compressive Receiver for Signal Detection," IEEE 1991, IEEE Transactions on Communications, vol. 39, No. 4, Apr. 1991, pp. 557-566.

Levy et al, "VCO Based Chirp Generation for Broad Bandwidth Compressive Receiver Applications," AIL Systems, Inc., Deer Park, New York, IEEE 1993 MTT-S Digest, pp. 1113-1115.

Lucyszyn, "Review of radio frequency microelectromechanical systems technology," Imperial College, London, IEE Proc.-Sci. Meas. Technol.vol. 151, No. 2, Mar. 2004, pp. 93-103.

Lyons et al., "High Temperature Superconductive Wideband Compressive Receivers," Analog Device Technology Group, Lincoln Laboratory, Invited Paper, IEEE Transactions on Microwave Theory and Techniques, vol. 44, No. 7, Jul. 1996, pp. 1258-1278.

Unser, "Sampling—50 Years After Shannon," Swiss Federal Institute of Technology, Lausanne, Switzerland, IEEE 2000 Proceedings of the IEEE, vol. 88, No. 4, Apr. 2000, pp. 569-587.

Sengupta et al, "Novel Ferroelectric Materials for Phased Array Antennas," U.S. Army Research Laboratory, Aberdeen Proving Groud, 1997 IEEE, IEEE Transactions on Ultrasonics, Ferroelectrics, and Frequency Control, vol. 44, No. 4, Jul. 1997, pp. 792-797.

Serhan et al., "Automatic Frequency Control Techniques for Microwave Active Filters," Limoges University, Limoges, France, 1997 IEEE MTT-S Digest, pp. 697-700.

Whittaker et al, "Digital chirp filter processing for improved performance of sweeping spectrum analysers," University of Surrey, Surrey, UK, Electronics Letters, Aug. 3, 2000, vol. 36, No. 16, pp. 1430-1432.

Agoston et al, "100 GHz Through-Line Sampler System with Sampling Rates in Excess of 10 G samples/second," Picosecond Pulse Labs, Boulder, Colorado, PSPL-100 Sampler Paper—Submitted to MTT 2003, http://www.picosecond.com->products->sampler modules, 3 pgs.

Akbari-Dilmaghani et al, "A High Q RF CMOS Differential Active Inductor," Imperial College, London, 1998 IEEE International Conference on Electronics, Circuits and Systems, vol. 3, Sep. 7-10, 1998, pp. 157-160.

Akos et al, "Direct Bandpass Sampling of Multiple Distinct RF Signals," 1999 IEEE Transactions on Communications, Vo. 47, No. 7, Jul. 1999, pp. 983-988.

Behbahani et al, "A Broad-Band Tunable CMOS Channel-Select Filter for a Low-IF Wireless Receiver," 2000 IEEE Journal of Solid-State Circuits, vol. 35, No. 4, Apr. 2000, pp. 476-489.

Brown et al, "Digital L-Band Receiver Architecture with Direct RF Sampling," NAVSYS Corp., Colorado Springs, Colorado, Position Location and Navigation Symposium, 1994, IEEE, Apr. 11-15, 1994, pp. 209-216.

Copeland et al., "5-GHz SiGe HBT Monolithic Radio Transceiver with Tunable Filtering," 2000 IEEE Transactions on Microwave Theory and Techniques, vol. 48, No. 2, Feb. 2000, pp. 170-181.

Deleniv et al, "Tunable Ferroelectric Filter-Phase Shifter," University of Technology, Gothenburg, Sweden, 2003 IEEE MTT-S Digest, pp. 1267-1270.

Juodawlkis et al, "Optical Down-Sampling of Wide-Band Microwave Signals," Invited Paper, Journal of Lightwave Technology, vol. 21, No. 12, Dec. 2003, pp. 3116-3124.

Karvonen et al, "A CMOS Quadrature Charge-Domain Sampling Circuit with 66-dB SFDR Up to 100 MHz," 2005 IEEE Transactions on Circuits and Systems—I: Regular Papers, vol. 52, No. 2, Feb. 2005, pp. 292-304.

Koc et al, "Direct RF Sampling Continuous-Time Bandpass /spl Delta/-/spl Sigma/A/D Converter Design for 3G Wireless Applications," ISCAS 2004, May 23-26, 2004, vol. I, pp. 409-412.

Latiri et al, "A reconfigurable RF sampling receiver for multistandard applications," Comptes Rendus Physique 7 (2006), pp. 785-793.

Lindfors et al, "A 3-V 230- MHz CMOS Decimation Subsampler," 2003 IEEE Transactions on Circuits and Systems—II: Analog and Digital Signal Processing, vol. 50. No. 3, Mar. 2003, pp. 105-117.

Loper, "A Tri-Phase Direct Conversion Receiver," Rockwell International, MILCOM 1990, Sep. 30-Oct. 3, 1990, pp. 1228-1232.

Luy et al, "Configurable RF Receiver Architecture," Daimler-Chrysler Research and Tecnology, Ulm, Germany, 2004 IEEE Microwave Magazine, Mar. 2004, pp. 75-82.

Minnis et al, "A Highly Digitized Multimode Receiver Architecture for 3G Mobiles," 2003 IEEE Transactions on Vehicular Technology, vol. 52, No. 3, May 2003, pp. 637-653.

Mirabbasi et al, "Classical and Modern Receiver Architectures," University of Toronto, 2000 IEEE Communications Magazine, Nov. 2000, pp. 132-139.

Mostafa et al, "WCDMA Receiver Architecture with Unique Frequency Plan," Micro Lnear Corp. San Jose, California and Texas Instruments, Inc., Dallas, Texas, ASIC/SOC Conference, 2001 Proceedings, 14th Annual IEEE International, Sep. 12-15, 2001, pp. 57-61.

Muhammad et al, "Direct RF Sampling Mixer With Recursive Filtering in Charge Domain," Texas Instruments Incorporated, Dallas, Texas, ISCAS, May 23-26, 2004, vol. 1, pp. 577-580.

Namgoong et al., "Direct-Conversion RF Receiver Design," 2001 IEEE Transactions on Communications, vol. 49, No. 3, Mar. 2001, pp. 518-529.

Pellon, "RF-to-Digital Receivers Employing Bandpass Multibit /spl Sigma//spl Delta/ ADC Architectures," Lockheed Martin Government Electronic Systems, Morristown, New Jersey, 20th Annual Gallium Arsenide Integrated Circuit (GaAs IC) Symposium, Nov. 1-4, 1998, pp. 11-14.

"Real-Time Sampling Downconverter Front Ends for Digital Radar and Wide-Bank Signaling," Picoscond Pulse Labs, 2500 55th Street, Boulder, CO 80301, (Nov. 2004).

Richter et al, "An Integrated Wideband-IF-Receiver Architecture for Mobile Terminals," Dresden University of Technology, Dresden, Germany, 2003 IEEE Radio Frequency Integrated Circuits Symposium, Jun. 8-10, 2003, pp. 583-586.

Shoji et al, "70-GHz-Band MMIC Transceiver With Integrated Antenna Diversity System: Application of Receive-Module-Arrayed Self-Heterodyne Technique," 2004 IEEE Transactions on Microwave Theory and Techniques, vol. 52, No. 11, Nov. 2004, pp. 2541-2549.

Springer et al, "RF System Concepts for Highly Integrated RFICs for W-CDMA Mobile Radio Terminals," 2002 IEEE Transactions on Microwave Theory and Techniques, vol. 50, No. 1, Jan. 2002, pp. 254-267.

Tatu et al, "Ka-Band Direct Digital Receiver," 2002 IEEE Transactions on Microwave Theory and Techniques, vol. 50, No. 11, Nov. 2002, pp. 2436-2442.

Tayebati et al, "Microelectromechanical tuneable filters with 0.47 nm linewidth and 70nm tuning range," Electonics Letters, Jan. 8, 1998, vol. 34, No. 1, pp. 76-78.

Thor et al, "A Direct RF Sampling Multifrequency GPS Receiver," Stanford University, Position Location and Navigation Symposium, 2002 IEEE, Apr. 15-18, 2002, pp. 44-51.

Tsui et al, "Digital Microwave Receiver Technology," Invited Paper, 2002 IEEE Transactions on Microwave Theory and Techniques, vol. 50, No. 3, Mar. 2002, pp. 699-705.

Valkama et al., "Advanced Receiver Architectures and I/Q Signal Processing," Tampere University of Technology, Tampere, Finland, First International Symposium on Control, Communications and Signal Processing, IEEE Jun. 2004, pp. 71-74.

Vaughan et al, "The Theory of Bandpass Sampling," 1991 IEEE Transactions on Signal Processing, vol. 39, No. 9, Sep. 1991, pp. 1973-1984.

Wooten et al, "Rapidly Tunable Narrowband Wavelength Filter Using LiNbO3 Unbalanced Mach-Zehnder Interferometers," Journal of Lightwave Technology, vol. 14, No. 11, Nov. 1996, pp. 2530-2536.

Pepper et al, "NLTLs Push Sampler Products Past 100 GHz," Microwaves & RF, Oct. 2005, 6 pgs.

Model 7620 DCSM VME Card Datasheet, Revision C, Picosecond Pulse Labs, Boulder, Colorado, Sep. 2005, 10 pgs.

Wepman, "Analog-to-Digital Converters and Their Applications in Radio Receivers," 1995 IEEE Communications Magazine, May 1995, pp. 39-45.

Ekelman et al., U.S. Appl. No. 60/373,163, filed Apr. 17, 2002, "Tunable modules for frequency agile receivers.", 16 pgs.

Brueller et al, "On Non-uniform Sampling of Signals," Israel Institute of Technology, Haifa, Israel, ISIE, Jul. 7-10, 1998, pp. 249-252.

Candes et al, "Robust Uncertainty Principles: Exact Signal Reconstruction From Highly Incomplete Frequency Information," 2006 IEEE Transactions on Information Theory, Vo. 52, No. 2, Feb. 2006, pp. 489-509.

Donoho, "Compressed Sensing," 2006 IEEE Transactions on Information Theory, vol. 52, No. 4., Apr. 2006, pp. 1289-1306.

Dragotti et al, "Exact Sampling Results for Signals with Finite Rate of Innovation Using Strang-Fix Conditions and Local Kernels," ICASSP 2005, Mar. 18-23, 2005, pp. 233-236.

Dragotti et al, "Wavelet Footprints: Theory, Algorithms, and Applications," 2003 IEEE Transactions on Signal Processing, vol. 51, No. 5, May 2003, pp. 1306-1323.

Duarte et al, "Distributed Compressed Sensing of Jointly Sparse Signals," Rice University, Houston, Texas, Asilomar Conference on Signals, Systems and Computers 2005, Oct. 28-Nov. 1, 2005, pp. 1537-1541.

Gansman et al, "Single Frequency Estimation with Non-uniform Sampling," Asilomar Conference on Signals, Systems and Computers 1996, Nov. 3-6, 1996, vol. 1., pp. 399-403.

Herley et al, "Minimum Rate Sampling and Reconstruction of Signals with Arbitrary Frequency Support," 1999 IEEE Transactions on Information Theory, vol. 45, No. 5, Jul. 1999, pp. 1555-1564.

Kumar et al, "On Distributed Sampling of Bandlimited and Non-Bandlimited Sensor Fields," University of California, Berkeley, California, ICASSP 2004, May 17-21, 2004 vol. III., pp. 925-928.

Lefkaditis et al., Ambiguities in the harmonic retrieval problem using non-uniform sampling, IEE Proceedings—Radar, Sonar and Navigation, Dec. 2001, pp. 325-329.

Maravic et al, "Channel Estimation and Synchronization with Sub-Nyquist Sampling and Application to Ultra-Wideband Systems," ISCAS 2004, May 23-26, 2004, pp. V-381-V-384.

Maravic et al, "Sampling and Reconstruction of Signals With Finite Rate of Innovation in the Presence of Noise," 2005 IEEE Transactions on Signal Processing, vol. 53, No. 8, Aug. 2005, pp. 2788-2805.

Pace et al, "Use of the Symmetrical Number System in Resolving Single-Frequency Undersampling Aliases," 1997 IEEE Transactions on Signal Processing, vol. 45, No. 5, May 1997, pp. 1153-1160.

Sanderson et al, "Reduction of Aliasing Ambiguities Through Phase Relations," 1992 IEEE Transactions on Aerospace and Electronic Systems, vol. 28, No. 4, Oct. 1992, pp. 950-956.

Sayiner et al, "A Non-Uniform Sampling Technique for A/D Conversion," ISCAS 193, May 3-6, 1993, pp. 1220-1223.

Styer et al, "Two Channel RSNS Dynamic Range," 2002 IEEE Transactions on Circuits and Systems—I: Fundamental Theory and Applications, vol. 49, No. 3., Mar. 2002, pp. 395-397.

Vetterli et al, "Sampling Signals With Finite Rate of Innovation," 2002 IEEE Transactions on Signal Processing, vol. 50, No. 6, Jun. 2002, pp. 1417-1428.

Walter, "Non-Uniform Sampling in Wavelet Subspaces," University of Wisconsin, Milwaukee, Wisconsin, ICASSP 1999, pp. 2057-2059.

Xia, "An Efficient Frequency-Determination Algorithm from Multiple Undersampled Waveforms," 2000 IEEE Transactions on Signal Processing Letters, vol. 7, No. 2, Feb. 2000, pp. 34-37.

Xiong et al, "A Non-uniform Sampling Tangent Type FM Demodulation," 2004 IEEE Transactions on Consumer Electronics, vol. 50, No. 3., Aug. 2004, pp. 844-848.

Zhu et al, "Adaptive Non-Uniform Sampling Delta Modulation for Audio/Image Processing," 1996 IEEE Transactions on Consumer Electronics, vol. 42, No. 4, Nov. 1996, pp. 1062-1072.

Dr. Martinez, "Intelligent Mixed-Signal Microsystems Technology (IMMST)", DARPA/MTO, Apr. 25, 2003, 8 pgs.

Matsuya et al., "A 16-Bit Oversampling A-to-D Conversion Technology Using Triple-Integration Noise Shaping", IEEE Journal of Solid-State Circuits, vol. SC-22, No. 6, Dec. 1987, pp. 921-929.

Wu et al., "New Current-Mode Wave-Pipelined Architectures for High-Speed Analog-To-Digital Converters", IEEE Transactions on Circuits and Systems-I: Regular Papers, vol. 51, No. 1, Jan. 2004, pp. 25-37.

Liem et al., "Architecture of a Single Chip Acoustic Echo and Noise Canceller Using Cross Spectral Estimation", IEEE, 2003, pp. 637-640.

Younis et al, "Efficient Adaptive Receivers for Joint Equalization and Interference Cancellation in Multiuser Space-Time Block-Coded Systems", IEEE Transactions on Signal Processing, vol. 51, No. 11, Nov. 2003, pp. 2849-2862.

Fudge et al, "Spatial Blocking Filter Derivative Constraints for the Generalized Sidelobe Canceller and Music", IEEE Transactions on Signal Processing, vol. 44, No. 1, Jan. 1996, pp. 51-61.

Lin et al., "A Low-Complexity Adaptive Echo Canceller for XDSL Applications", IEEE Transactions on Signal Processing, vol. 52, No. 5, May 2004, pp. 1461-1465.

Inerfield et al., High Dynamic Range InP HBT Delta-Sigma Analog-to-Digital Converters', IEEE Journal of Solid-State Circuits, vol. 38, No. 9, Sep. 2003, pp. 1524-1532.

Harris et al., "New Architectures With Distributed Zeros for Improved Noise Shaping of Delta-Sigma Analog to Digital Converters", IEEE, 1993, pp. 421-425.

Ueno et al., "A Fourth-Order Bandpass Δ-Σ Modulator Using Second-Order Bandpass Noise-Shaping Dynamic Element Matching", IEEE Journal of Solid-State Circuits, vol. 37, No. 7, Jul. 2002, pp. 809-816.

Vadipour, "A Bandpass Mismatch Noise-Shaping Technique for Σ-Δ Modulators", IEEE Transactions on Circuits and Systems—II: Express Briefs, vol. 51, No. 3, Mar. 2004, pp. 130-135.

Lefkaditis et al., "Ambiguities in the Harmonic Retrieval Problem Using Non-Uniform Sampling", IEEE Proc.-Radar, Sonar Navig., vol. 148, No. 6, Dec. 2001, pp. 325-329.

Sayiner et al., "A Non-Uniform Sampling Technique for A/D Conversion", Circuits and Systems, ISCAS '93, 1993 IEEE International Symposium, May 3-6, 1993, pp. 1220-1223 vol. 2.

Chavira et al., "Implementation of Accurate Blind Real Time Interference Suppression" IEEE, 2007, pp. 209-212.

Sumanen et al., "Dual-Mode Pipeline A/D Converter for Direct Conversion Receivers", Electronics Letters, vol. 38, No. 19, Sep. 2002, pp. 1101-1103.

Stojcevski et al., "A Reconfigurable Analog-To-Digital Converter for Utra-Tdd Mobile Terminal Receiver", IEEE, 2002, pp. 613-616.

Petraglia et al., "Analysis of Mismatch Effects Among A/D Converters in a Time-Interleaved Waveform Digitizer", IEEE Transactions on Instrumentation and Measurement, vol. 40, No. 5, Oct. 1991, pp. 831-835.

Peralias et al., "Structural Testing of Pipelined Analog to Digital Converters", IEEE, 2001, pp. 436-439.

Ndjountche et al., "Adaptive Calibration Techniques for Time-Interleaved ADCs", Electronics Letters, vol. 37, No. 7, Mar. 2001, pp. 412-414.

Mortezapour et al, "A Reconfigurable Pipelined Data Converter", IEEE, 2001, pp. 314-317.

Lundin et al., "On External Calibration of Analog-To Digital Converters", IEEE, 2001, pp. 377-380.

Liu et al., "A 9-b 40-Msample/s Reconfigurable Pipeline Analog-To-Digital Converter", IEEE Transactions on Circuits and Systems-II: Analog and Digital Signal Processing, vol. 49, No. 7, Jul. 2002, pp. 449-456.

Ganesan et al., "Analog-Digital Partitioning for Field-Programmable Mixed Signal Systems", IEEE, 2001, pp. 172-185.

Asuri et al., "Time-Stretched ADC Arrays", IEEE Transactions on Circuits and Systems-II: Analog and Digital Signal Processing, vol. 49, No. 7, Jul. 2002, pp. 521-524.

Younis et al., "A Calibration Algorithm for a 16-Bit Multi-Path Pipeline ADC", IEEE Midwest Symp. on Circuits and Systems, 43$^{rd}$, Aug. 2000, pp. 158-161.

Wang et al., "Tunable Optical Wavelength Converter With Reconfigurable Functionality", Technical Digest, 1997, pp. 76-77.

Veljanovski et al., "Reconfigurable Architecture for Utra-TDD System", Electronics Letters, vol. 38, No. 25, Dec. 2002, pp. 1732-1733.

Velazquez, "High-Performance Advanced Filter Bank Analog-To-Digital Converter for Universal RF Receivers", IEEE, 1998, pp. 229-232.

Poorfard et al., "Time-Interleaved Oversampling A/D Converters: Theory and Practice", IEEE Transactions on Circuits and Systems-II:Analog and Digital Signal Processing, vol. 44, No. 8, Aug. 1997, pp. 634-645.

Jamal et al., "A 10-b 120-Msample/s Time-Interleaved Analog-To-Digital Converter With Digital Background Calibration", IEEE Journal of Solid-State Circuits, vol. 37, No. 12, Dec. 2002, pp. 1618-1627.

Gulati et al., "A Low-Power Reconfigurable Analog-To-Digital Converter", IEEE Journal of Solid-State Circuits, vol. 36, No. 12, Dec. 2001, pp. 1900-1911.

Lee, "Reconfigurable Analog Integrated Circuit Architecture Based on Switched-Capacitor Techniques", IEEE, 1996, pp. 148-158.

Yu et al., "Error Analysis for Time-Interleaved Analog Channels", IEEE, 2001, pp. 468-471.

Bernardinis et al, "Dynamic Stage Matching for Parallel Pipeline A/D Converters", IEEE, 2002, pp. 905-908.

Batten et al., "Calibration of Parallel ΔΣ ADCs", IEEE Transactions on Circuits and Systems-II: Analog and Digital Signal Processing, vol. 49, No. 6, Jun. 2002, pp. 390-399.

Mayes et al, "A Low-Power 1MHz, 25 mW 12-Bit Time-Interleaved Analog-To-Digital Converter", IEEE Journal on Solid-State Circuits, vol. 31, No. 2, Feb. 1996, pp. 169-178.

Lee, "Reconfigurable Data Converter As a Building Block for Mixed-Signal Test", IEEE, 1997, pp. 359-363.

Lee, "Reconfigurable Pipelined Data Converter Architecture", IEEE, 1997, pp. 162-165.

Jin et al., "A Digital Technique for Reducing Clock Jitter Effects in Time-Interleaved A/D Converter", IEEE, 1999, pp. 330-333.

Gulati et al., "A Low-Power Reconfigurable Analog-To-Digital Converter", IEEE International Solid-State Circuits Conference, 2001, 3 pgs.

Dyer et al., "An Analog Background Calibration Technique for Time-Interleaved Analog-To-Digital Converters", IEEE Journal of Solid-State Circuits, vol. 33, No. 12, Dec. 1998, pp. 1912-1919.

Copending Application, Fudge et al., "Interference Cancellation for Reconfigurable Direct RF Bandpass Sampling Interference Cancellation", U.S. Appl. No. 12/317,485, filed Dec. 23, 2008, 43 pgs.

Fudge, Interference Cancellation for Reconfigurable Direct RF Bandpass Sampling Interference Cancellation, U.S. Appl. No. 12/317,485, Office Action, Jun. 8, 2011, 19 pgs.

* cited by examiner

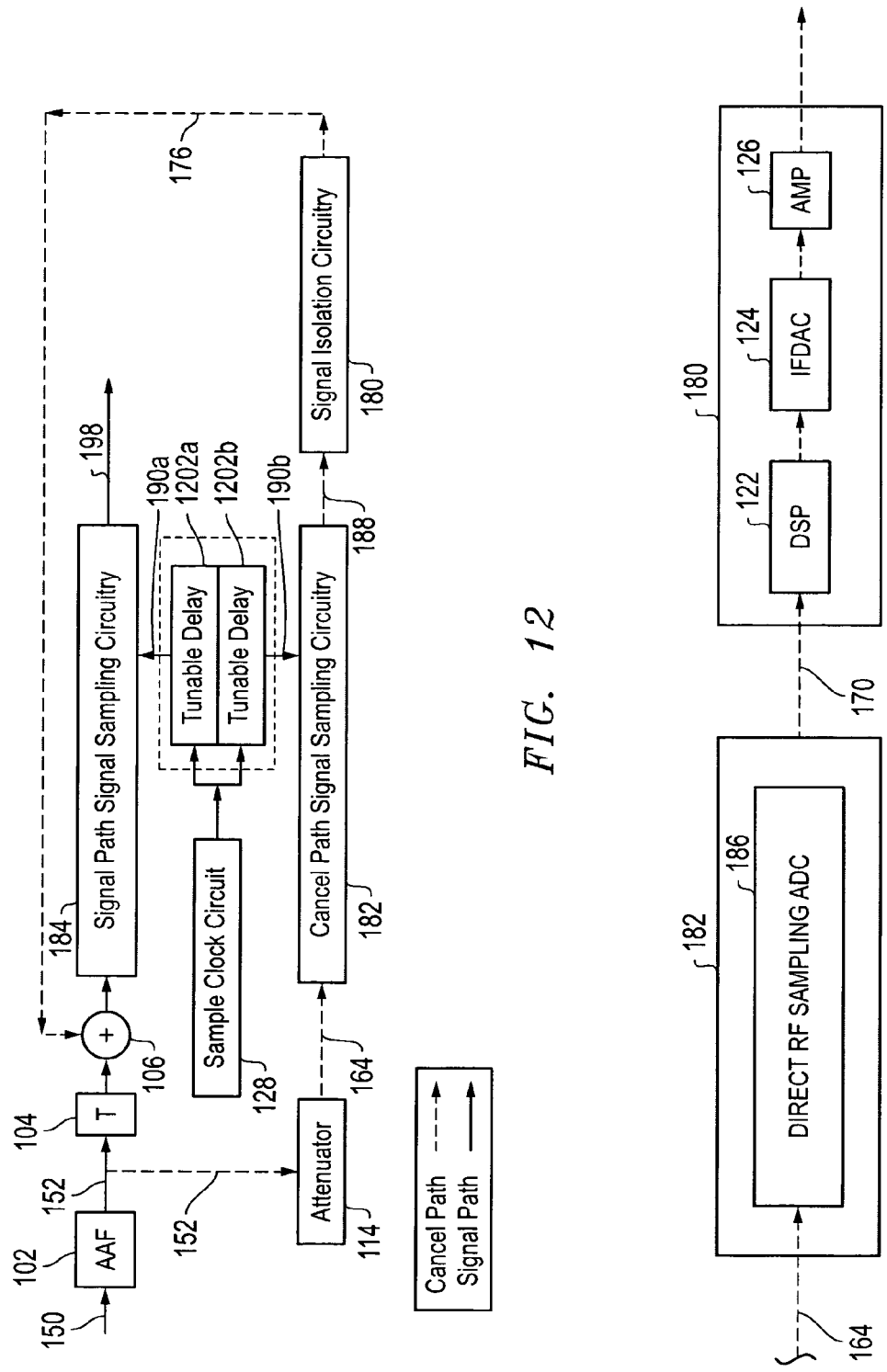

SYSTEMS AND METHODS FOR INTERFERENCE CANCELLATION

This application is related in subject matter to concurrently filed U.S. patent application Ser. No. 12/317,485, entitled "INTERFERENCE CANCELLATION FOR RECONFIGURABLE DIRECT RF BANDPASS SAMPLING INTERFERENCE CANCELLATION" by Fudge, which is hereby incorporated by reference in its entirety.

FIELD OF THE INVENTION

This invention relates generally to signal processing, and more particularly to interference cancellation.

BACKGROUND OF THE INVENTION

Loss of signal dynamic range is a problem commonly caused by strong interferers in a radio frequency (RF) environment. Typical approaches employed to address strong interferers include the use of fixed or tunable notch filters. Fixed notch filters can handle known RF interferers, but cannot adapt to new interferers. Systems employing fixed notch filters must be re-designed and modified substantially if the fixed interference environment changes. Tunable notch filters, while providing more flexibility, suffer from lack of tuning resolution. In particular, tunable notch filters tend to have a constant quality factor (Q), which means that the notch bandwidth is proportional to the RF frequency. Attempts at developing tunable notch filters with adequate Q has been an active area of research for years and continues to be a significant technical challenge. However, even if tunable notch filters could meet the desired Q requirements, they still lack flexibility in that they can only cancel a single interferer per notch. Employing multiple notches essentially implies using multiple filters.

Another solution to addressing interference is to perform interference cancellation. Spatial beamforming systems can use degrees of freedom to steer spatial notches—this is the concept, for example, behind the generalized sidelobe canceller. However, these techniques do not apply to frequency cancellation and do not apply to single channel receivers in any case. Furthermore, even spatial beamformers may be susceptible to dynamic range issues caused by strong interferers. The goal of active interference cancellation is to actively cancel the interference by developing a cancellation signal, and in order to avoid problems caused by interference such as spurious signals and signal distortion, the interference is cancelled early in the RF chain.

One solution to RF interference cancellation is to estimate the interferer via a separate channel that is not in saturation, or adaptively while in saturation. An estimate of the interference is then inverted (or phase matched 180 degrees out of phase) and added to the input. In such an architecture, interference signals may be heavily attenuated in the cancellation path so that the interferer analog to digital converter (ADC) is not saturated. An adaptive filter block (or other digital signal processing (DSP) function), may then be used to filter out all signals and noise other than the interference. The interference may then be amplified, phase inverted, and added to the RF input. Time delay may be employed to allow cancellation of non-periodic signals or non-periodic signal components. An example DSP adaptive filter may consist of an analysis filter bank followed by thresholds on each filter output with filter outputs below threshold being set to zero and filter outputs above threshold being passed, followed by a synthesis filter bank. The DSP would typically also include phase adjustments and possibly additional phase matching based on monitoring of cancellation output. Reconstruction of a signal after ADC and up conversion is subject to imperfections introduced in the up conversion process and the need to know the signal frequency and phase in order to coherently cancel.

SUMMARY OF THE INVENTION

Disclosed herein are systems and methods that may be employed to provide interference cancellation. Using the disclosed systems and methods, a first signal having a first frequency may be cancelled with a second frequency having a second and different (e.g., lower) frequency by employing sampling (e.g., pulse-based sampling or other wide bandwidth short aperture sampling technique without hysteresis between samples) to cancel the first signal with the separate signal at the sample instances. The disclosed systems and methods may be implemented in one embodiment with two sampling paths, a signal path and a cancel path. The cancel path may be attenuated relative to the signal path to prevent distortion and saturation in the cancel path of interfering signals, and optional time delay may be employed to allow cancellation of non-periodic signal components. In possible embodiments, the cancel path may include digital signal processing (DSP) implemented after an ADC, or may include a tunable filter. In one embodiment, direct RF bandpass sampling may be employed in the signal and cancel paths, and folded (or aliased) intermediate frequency (IF) may be used to cancel RF interference (i.e., rather than the same RF). In one embodiment, direct RF interference cancellation may be employed for high RF input signal bands (e.g., from about 2 GHz to greater than about 40 GHz, alternatively from about 2 GHz to about 40 GHz, alternatively from about 3 GHz to about 20 GHz).

Advantageously, the disclosed systems and methods may be applied to direct RF interference cancellation by using direct RF sampling on both signal path and cancellation path, without the need for up-conversion of a cancellation signal from IF to RF. In this regard, traditional methods of up-conversion, such as mixer-based solutions, are very sensitive to knowing the exact frequency of the RF interference and achieving the proper mixer phase to match the RF interference phase would be critical to proper cancellation.

Thus, the disclosed systems and methods may be implemented to provide cancellation of one frequency with a different frequency, and in one embodiment to provide cancellation of a signal at one RF frequency with its folded IF version without up-conversion. Additionally, cancellation of an RF signal may be advantageously achieved without having to know its exact frequency. The disclosed systems and methods may be implemented with reconfigurable direct or Nyquist folding radio frequency (RF) receivers to allow significantly improved dynamic range (e.g., improvements in dynamic range of 10 dB to 40+ dB) over conventional methods. In one exemplary embodiment, the disclosed systems and methods may be implemented to improve the dynamic range of a Nyquist folding receiver, e.g., to suppress a strong narrow-band interfering signal by up to about 50 dB. The disclosed systems and methods may be implemented (e.g., in electronic warfare (EW), electronic signals intelligence (ELINT), electronic warfare support measures applications (ESM), etc.), for monitoring extremely wide bandwidths. For example, in one exemplary embodiment the disclosed systems and methods may be implemented with a Nyquist folding receiver in an EW, ELINT, ESM application for monitoring bandwidths of from about 4 GHz up to about 20 GHz or more) with low signal density. In another exemplary embodiment, the disclosed systems and methods may be implemented with a direct RF receiver in a communications application for monitoring bandwidths down to about 10 MHz or less. In another exemplary embodiment, the disclosed systems and methods may be implemented with a direct RF receiver in an EW, ELINT, ESM application for monitoring bandwidths of about 100 MHz to about 1 GHz or more. It being understood that the foregoing bandwidth ranges are exemplary only.

In one embodiment, the disclosed systems and methods may be implemented using periodic pulse-based sampling, wide bandwidth short aperture sampling, or other sampling technique to cancel an RF input signal with a folded intermediate frequency (IF) version of the RF signal. In this regard, an intermediate frequency (IF) version of the original RF interference signal may be developed via bandpass sampling (e.g., at a much lower frequency than the RF interference signal), and inverting this IF signal to cancel the RF signal as part of a bandpass sampling process where the sampling is performed via pulse-based sampling. In such an embodiment, the RF signal does not need to be cancelled at all times, but instead only needs to be cancelled when sampling occurs (i.e., only at the sample times) since it does not matter what the signal is doing between sample times. This is unlike conventional cancellation, where the exact same frequency must be employed to cancel at all times in the presence of phase or frequency mis-match. Thus, in the practice of the disclosed systems and methods, the frequency of the interference does not need to be known since the RF signal is cancelled with the folded IF copy, meaning only signal phase and amplitude are considerations. Further, no upconversion or downconversion is required since cancellation may be performed without need for consideration of frequency.

As an example only, IF frequency for ELINT applications may be less than about 1 GHz, while corresponding RF frequency may be as high as 20 GHz or more. In one example for illustration purposes, an RF signal may have a frequency of about 10.4 GHz, and a sample rate of about 2 Gsps may be employed to result in an IF frequency of about 400 MHz. As another example for illustration purposes, an RF signal may have a frequency of about 130 MHz, and a sample rate of about 200 Msps may be employed to result in an IF frequency of about 70 MHz.

Since the disclosed systems and methods may be implemented without up-conversion of the cancellation signal, errors introduced by the up-conversion process may be avoided, e.g., including phase noise and mis-match between desired frequency/phase and achieved mixer frequency/phase. Further, the disclosed systems and methods may be implemented without knowledge of the exact frequency of the signal to be cancelled. Note that when up-converting the cancellation signal, any frequency estimation error can result in not just imperfect cancellation, but can even introduce an extra interferer (namely the cancellation signal itself). This embodiment provides the particular advantage that the system complexity may be greatly reduced while maintaining good performance, thus the cost, size, weight, and power may all be significantly reduced when compared to approaches relying on conventional technology.

In one exemplary embodiment of the disclosed systems and methods, the impact of sample clock imperfections may be mitigated by using the same clock for both the signal and cancel paths. In this regard, the same clock may be employed to drive two system pulse-based samplers (i.e., a signal path sampler and a cancellation path sampler) so that the folded IF signal is synchronized with the RF signal to meet the condition of canceling the RF signal at the sample instances. In another embodiment, a cancellation signal may be synchronized with the RF signal, for example, by developing the cancellation signal using a bandpass sampling ADC in the cancel path. In yet another exemplary embodiment, the disclosed systems and methods may be implemented in conjunction with a Nyquist folding receiver.

In one exemplary embodiment, an interference cancellation system may be provided for cancellation of narrow band periodic interferers that utilizes two RF samplers and two interpolation filters, with a first RF sampler and a first interpolation filter coupled in series within a signal path of the interference cancellation system, and with a second RF sampler and a second interpolation filter coupled in series within a cancel path of the interference cancellation system. The signal path and cancel path of the interface cancellation system may be fed with an analog input RF signal. The IF output of the second interpolation filter of the cancel path may be fed back to the input of the first RF sampler of the signal path for cancellation after being delayed by a tunable time delay. The folded frequency that is canceled depends on the time delay, which may be tuned to control the frequency of the folded cancelled signal, e.g., to achieve phase cancellation (rather than signal inversion) so that the cancel path signal is 180 degrees out of phase with the signal path signal and so that cancellation is phase dependent. All RF signals which fold to the same IF are cancelled, which in effect generates a series of notches throughout the spectrum, allowing cancellation of an RF interferer with an IF signal without the need to estimate the Nyquist zone. Although the cancellation may have a few other partial nulls, the majority of the band is still receivable and the average clock rate may be changed to cause the partial nulls and the nulls in other Nyquist zones to move, without having to know which Nyquist zone the RF interferer is from that is being cancelled.

In one exemplary embodiment, the disclosed systems and methods may be employed with changing clock rate, and the ability to track cancellation as RF sample rate changes may be provided by monitoring the interference power level and adapting the time delay (e.g., using adaptive time delay circuitry) in a power minimization scheme (e.g., such as constrained power minimization). The ability to so track cancellation as RF sample rate changes may be enhanced when the RF sample rate changes smoothly.

The disclosed systems and methods may be implemented to provide a solution for single or multiple interfering source cancellation. In the case of multiple source cancellation, the cancellation path may be modified with a high dynamic range interference cancellation (HDRIC) path. In either case, no upconversion of the IF cancellation signal is required to cancel an RF interferer signal, but rather the IF signal (e.g., as output by a cancel path DAC) may be used to cancel the RF interferer signal directly. Specifically, because pulse-based RF sampling is employed for the first stage of the interference cancellation, it does not matter what the interference is doing between sample points, which is unlike the case with a conventional ADC, where saturation between clocks will result in distortion or even saturation at sample time because of circuit hysteresis or other circuit memory effects. Thus, in the practice of the disclosed methods an RF interferer signal may be cancelled only at the sample times instead of everywhere, allowing RF cancellation using a folded version without upconversion of the IF cancellation signal.

In one respect, disclosed herein is an interference cancellation system configured to receive an analog input RF signal, the interference cancellation system including: cancel path circuitry including cancel path signal sampling circuitry and signal isolation circuitry; and signal path circuitry including signal path signal sampling circuitry. The cancel path signal sampling circuitry may be coupled to sample the analog input RF signal to produce an analog or digital cancel path selected sample IF signal, and the signal isolation circuitry may be coupled to receive the cancel path selected sample IF signal and to isolate a signal within the cancel path analog selected sample IF signal and to output the isolated signal as an analog cancellation IF signal having a different frequency than the analog input RF signal. The signal path circuitry may be coupled to combine the analog input RF signal with the analog cancellation IF signal to create a modified analog input signal, and the signal path signal sampling circuitry may be coupled to sample the modified analog input signal to produce a signal path analog or digital selected sample signal.

In another respect, disclosed herein is a method for canceling interference in an analog input RF signal, including: providing cancel path circuitry including cancel path signal sampling circuitry and signal isolation circuitry; providing signal path circuitry including signal path signal sampling circuitry; providing the analog input RF signal to the signal path circuitry and the cancel path circuitry; utilizing the cancel path signal sampling circuitry to sample the analog input RF signal to produce an analog or digital cancel path selected sample IF signal; utilizing the signal isolation circuitry to isolate a signal within the analog or digital cancel path selected sample IF signal and to output the isolated signal as an analog cancellation IF signal having a different frequency than the analog input RF signal; combining the analog input RF signal with the analog cancellation IF signal to create a modified analog input signal; and utilizing the signal path signal sampling circuitry to sample the modified analog input signal to produce a signal path analog or digital selected sample signal.

BRIEF DESCRIPTION OF THE DRAWINGS

FIG. 12 is a block diagram of an cancellation system as it may be configured according to one exemplary embodiment of the disclosed systems and methods.

FIG. 13 is a block diagram of cancel path signal sampling circuitry and cancel path signal isolation circuitry according to one exemplary embodiment of the disclosed systems and methods.

DESCRIPTION OF ILLUSTRATIVE EMBODIMENTS

Figure 1:
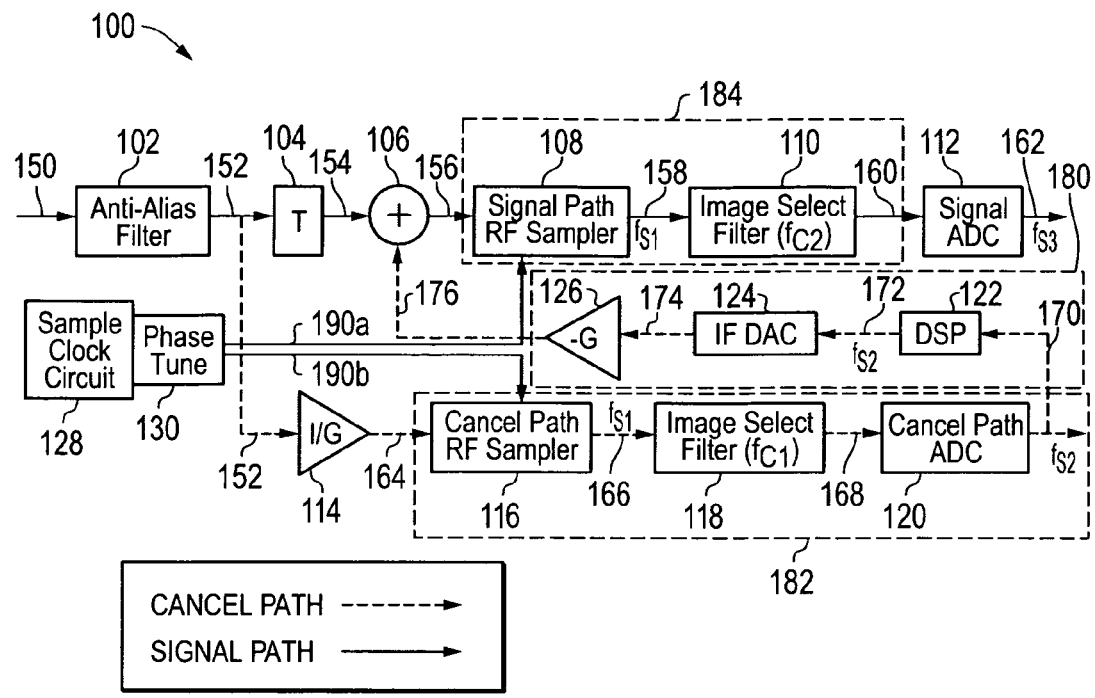
FIG. 1 is a block diagram of a direct RF interference cancellation (DRIC) system as it may be configured according to one exemplary embodiment of the disclosed systems and methods.

FIG. 1 illustrates a direct RF interference cancellation (DRIC) system 100 as it may be configured according to one embodiment of the disclosed systems and methods. As shown in FIG. 1, system 100 is configured to receive an analog input radio frequency (RF) signal 150 (e.g., from a RF antenna or other suitable source) and to provide a digital selected sample signal 162. Analog input RF signal 150 may include one or more desired signals in the presence of one or more interferer signals. In one embodiment, a DRIC system 100 may be employed to provide interference cancellation for a reconfigurable direct RF receiver to allow significantly improved dynamic range over conventional methods. Examples of such reconfigurable direct RF receivers include those receiver systems described in U.S. patent application Ser. No. 11/247,338 entitled "RECONFIGURABLE DIRECT RF BANDPASS SAMPLING RECEIVER AND RELATED METHODS," filed on Oct. 11, 2005; and U.S. Pat. No. 7,436,910 entitled "DIRECT BANDPASS SAMPLING RECEIVERS WITH ANALOG INTERPOLATION FILTERS AND RELATED METHODS," each of the foregoing references being incorporated herein by reference in its entirety. It will be understood that the methodology of DRIC system 100 may be employed for the conversion of a variety of types of electromagnetic and analog signals to digital signals (e.g., radio frequency signals, optical signals, acoustic signals, etc.) in a variety of signal processing applications, e.g., digital receivers, communications systems, sonar, radar, high quality headsets, hearing devices, etc. In this regard, an "RF signal" as used herein includes any time domain waveform that may be bandpass sampled.

Figure 2:
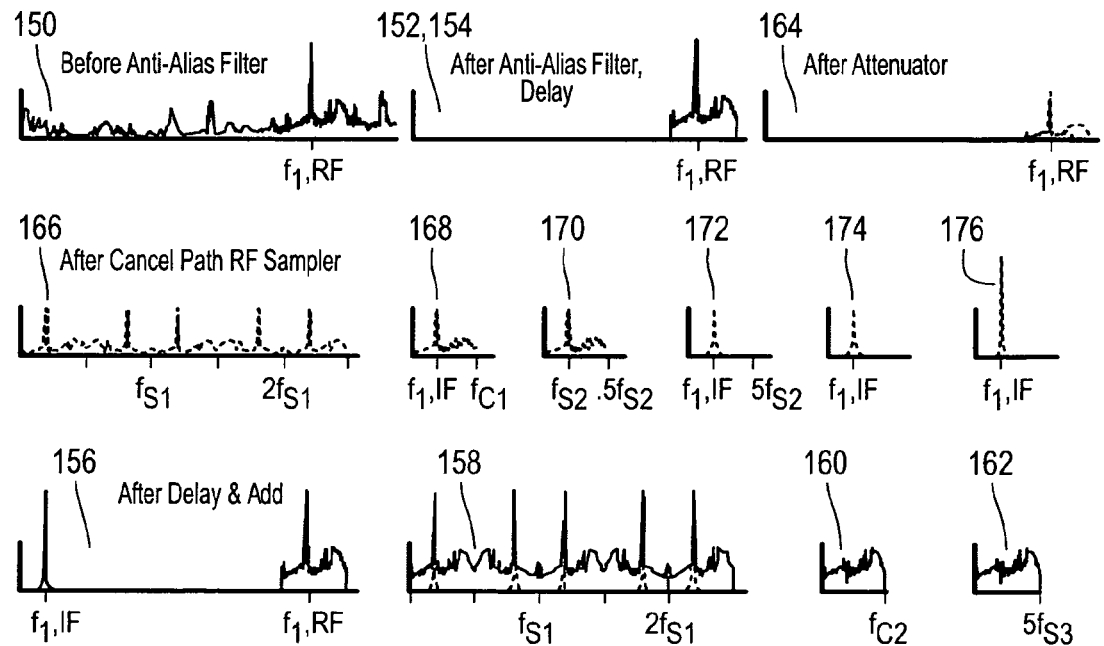
FIG. 2 illustrates a spectral example of a signal as it may be processed by a DRIC configured according to one embodiment of the disclosed systems and methods.

FIG. 2 illustrates a spectral example (amplitude versus frequency) of a signal as it may be processed by DRIC system 100 according to one exemplary embodiment. As shown in FIGS. 1 and 2, analog input RF signal 150 includes RF interferer signal centered $f_1$ and is first provided to anti-alias filter 102. In this exemplary embodiment, anti-alias filter 102 may be any circuitry configuration that is tuned to filter out undesired frequencies of input signal 150 and to provide filtered analog input RF signal 152 having a selected frequency range of interest as shown. Example circuitry that may be utilized for anti-alias filter 102 includes, but is not limited to, bandpass filter, etc.

As shown in FIGS. 1 and 2, filtered analog input RF signal 152 is provided to optional time delay circuitry 104 that may be implemented to provide filtered analog input RF signal 152 as a delayed filtered RF signal 154 to summer 106. Implementation of optional time delay circuitry 104 allows for cancellation of non-periodic interferers and will be described further herein. Optional time delay circuitry 104 is not required for cancellation of periodic interferers. Filtered analog input RF signal 152 is also provided through the feedback cancel path (shown in dashed line in FIG. 1) to summer 106. An optional non-zero time delay T may be provided by time delay 104 to produce delayed filtered analog input RF signal 154 that is time delayed relative to filtered analog input RF signal 152 so that components of the cancel path see the interferer signal present in analog input RF signal 150 before signal path components downstream of summer 106. This time delay allows cancellation of the interferer signal (i.e., using analog cancellation IF signal 176) before the interferer signal is received by signal path components downstream of summer 106 and provides for the ability to cancel non-periodic interferers. Further information on feedback cancellation processing may be found in U.S. Pat. Nos. 6,956,517 and 7,091,894, each of which is incorporated herein by reference in its entirety. While this overall architecture is sometimes referred to as a feedforward architecture, the term "feedback" is used herein since portions of the cancellation may be controlled via feedback loops.

Still referring to FIGS. 1 and 2, filtered analog input RF signal 152 of the cancel path (shown in dashed line in FIG. 1) may be strongly attenuated (i.e., 10 dB up to 40 dB or more) by attenuator 114 to produce attenuated filtered RF signal 164 so as to avoid saturation of pulse-based cancel path RF sampler 116 of cancel path signal sampling circuitry 182. Example circuitry that may be utilized for the cancel path RF sampler circuitry 116 includes RF samplers from PICOSECOND PULSE LABS (PSPL). Further information on configuration of RF sampler 116 and anti-alias filter 102 may be found in U.S. patent application Ser. No. 11/247,338 entitled "RECONFIGURABLE DIRECT RF BANDPASS SAMPLING RECEIVER AND RELATED METHODS," filed on Oct. 11, 2005; and U.S. Pat. No. 7,436,910 entitled "DIRECT BANDPASS SAMPLING RECEIVERS WITH ANALOG INTERPOLATION FILTERS AND RELATED METHODS," each of the foregoing references being incorporated herein by reference in its entirety.

As shown in FIG. 1, cancel path RF sampler 116 receives a sampling clock (Fs) input signal 190*b* at a desired sampling frequency and performs pulse-based sampling of attenuated filtered RF signal 164 based thereupon. Sampling clock (Fs) input signal 190*b* is synchronized with sampling clock (Fs) input signal 190*a* that is provided to signal path RF sampler 108 of signal path signal sampling circuitry 184 as shown. Sampling clock (Fs) signal 190*b* determines the sampling frequency for the cancel path RF sampler 116. This sampling clock (Fs) input signal 190*b* may be generated by sample clock circuit 128 (e.g., multi-clock generation circuitry) that is capable of generating two or more clock signals that can be selected and used as sampling clocks (CLK1, CLK2 . . . ) for the sampling clock signal 190*b* that is provided to cancel path RF sampler 116. It is noted that sample clock circuit 128 could be implemented using a wide variety of clock circuits. For example, the sample clock circuit 128 could be configured to always generate multiple clocks from which a sampling clock is selected. Alternatively, the sample clock circuit 128 could be configured to generate a single output clock signal that is adjusted to provide a programmable clock output signal at the desired sampling frequency. Other variations could be provided, as desired. It is also noted that in some embodiments a single clock signal could be utilized, if desired. In such an implementation, the sample clock circuit 128 would provide a single fixed sampling clock output signal for the cancel path RF sampler 116.

Optional phase tuning circuitry 130 may be provided as shown, e.g., to allow minor alignment adjustments of the phase of sampling clock (Fs) signals 190*a* and/or 190*b* so as to provide better control over cancellation. For example, if sampling clock (Fs) signal 190*a* is not exactly phase matched to sampling clock (Fs) signal 190*b*, then the phase of sampling clock (Fs) signal 190*a* may be adjusted to match the phase of sampling clock (Fs) signal 190*b* (or vice-versa). Further, if optional time delay circuitry 104 is not as precise as required (e.g., resulting in mis-match between the cancel path and signal path), then clock phase of sampling clock (Fs) signals 190*a* and/or 190*b* may be adjusted to compensate for the lack of precision of time delay circuitry 104. Examples of suitable phase tuning circuitry include, for example, voltage controlled time/phase delay circuits, etc.

As shown in FIG. 12, in one exemplary embodiment a single clock signal from sample clock circuit 128 may be split to provide sampling clock (Fs) input signals 190*a* and 190*b*, rather than providing and synchronizing separate clock circuits as may be employed in another exemplary embodiment. Also shown in FIG. 12 are separate tunable delays 1202*a* and 1202*b* that may be provided to perform the function of phase tune 130. It will be understood that sample clock circuit 128 and phase tuning circuitry 130 may be implemented in any other alternative circuitry configuration suitable for generating sampling clock (Fs) input signals 190*a* and 190*b* including, for example, as a single sample clock circuitry with integrated sample clock circuit and phase tuning circuitry circuit components.

It is noted that provision of different clock signals allow for selection of an appropriate sampling clock based on meeting the Nyquist criteria of the bandpass filter and based on criteria so as to avoid Nyquist sampling problems due to Nyquist boundaries. Nyquist zones are determined by the sampling rate for the sampling circuitry 106, and Nyquist criteria locate sampling zone boundaries at integer (K=0, 1, 2, 3 . . . ) multiples of $f_s/2$ starting at DC (frequency=0 Hz). In addition, Nyquist zones alternate between non-inverted and inverted spectrums. Traditional Nyquist criteria states that for bandpass sampling, the sampling rate must be two-times or greater than the bandwidth of the signal frequency range of interest, and that for baseband sampling, the sampling rate must be two-times or greater than the maximum frequency for the signal frequency range of interest.

As frequency ranges within the signal input spectrum are analyzed, depending upon the sampling frequency for the cancel path RF sampler 116, one or more Nyquist boundaries could be crossed during processing. Thus, by having multiple sampling clock signals available, when a Nyquist boundary for a first sampling clock signal is being reached during processing across a frequency range, a switch can be made to using a second sampling clock signal. As such, the Nyquist boundary will also change based upon this new sampling frequency. In operation, therefore, if anti-alias filter 102 is tuned to a new frequency and its bandwidth includes a Nyquist boundary, a switch could be made to an alternative sampling frequency so that reconstruction problems at the Nyquist boundaries can be avoided. Thus, with proper selection of the sampling clock signals, the respective Nyquist zone boundaries for these sampling clock frequencies can be made far enough apart so that Nyquist sampling problems for the first sampling clock can be avoided by switching to the second sampling clock, and vice versa. In addition, more than two clock signals may be employed, and any number of selectable clock signal frequencies could be provided, as desired. It will be understood that similar comments and methodology may be applied to operation of signal path RF sampler 108 which is described hereinbelow.

Still referring to FIGS. 1 and 2, analog sample RF signal 166 is provided from cancel path RF sample circuitry 116 to image select filter circuitry 118 of cancel path signal sampling circuitry 182. As shown, analog sample RF signal 166 includes multiple positive and negative folded spectral images (repeating at $f_{s1}$, $2f_{s1}$, etc.) obtained by convolving attenuated filtered RF signal 164 in the frequency domain by a stream of impulses derived from sampling clock (Fs) input signal 190b. Image select filter circuitry 118 may be, for example, a low pass filter, bandpass filter, or other circuitry that is suitable for selecting a desired folded image from the multiple folded images of analog sample RF signal 166, i.e., to select a desired positive image corresponding to an even Nyquist zone or to select a desired negative that corresponds to an odd Nyquist zone. One particular example of circuitry that may be employed for image select filter circuitry 118 include, but are not limited to, a low pass filter that is configured to select the lowest frequency image from the multiple folded spectral images of analog sample signal 166, or any other circuitry that is suitable for selecting all or part of a single Nyquist zone to form an IF signal image. Image select filter circuitry 118 then provides the selected folded image as analog selected sample IF signal 168 to cancel path ADC circuitry 120 of cancel path signal sampling circuitry 182. ADC circuitry 120 in turn Nyquist samples analog selected sample IF signal 168 to produce a digital version of the selected folded image and provides it as a digital selected sample IF signal 170 to digital signal processing (DSP) circuitry 122 of cancel path signal isolation circuitry 180. As shown, cancel path signal isolation circuitry 180 in this embodiment includes digital signal processing (DSP) circuitry 122, IF digital to analog converter (DAC) 124, and amplifier circuitry 126.

In the practice of the disclosed systems and methods, cancel path ADC 120 may be any circuitry (e.g., a single ADC device or combination of devices such as ADC device/s in combination with gain/attenuator device/s) suitable for analog to digital conversion. Examples of suitable ADC circuitry for cancel path ADC 120 include, but are not limited to, successive approximation ADCs, flash ADCs, sample and hold ADCs, sigma delta ADCs, composite ADCs, etc. It is also possible that cancel path ADC 120 circuitry may be provided with noise shaping and/or tuning capability (e.g., a noise shaping tunable sigma-delta ADC device).

In the embodiment of FIGS. 1 and 2, DSP circuitry 122 is configured to isolate the interferer and remove the noise floor from digital selected sample IF signal 170 (i.e., so as to reduce noise from the cancel path getting into the signal path after summation of cancel path and signal path in summer 106) to produce processed digital cancel path IF signal 172. DSP circuitry 122 may include, for example, an analysis filter bank followed by thresholding, then followed by zeroing out low amplitude filters from the filter bank, and then followed by synthesis to reconstruct any interferers. Note that processed digital cancel path IF signal 172 will be zero if there are no interferers present. However, if at least one interferer is present, then processed digital cancel path IF signal 172 will be the at least one interferer. Further, it will be understood that multiple interferers may be present in the cancel path, in which case processed digital cancel path IF signal 172 will include the multiple interferers. Further information on interference cancellation may be found in U.S. Pat. Nos. 6,956,517 and 7,091,894, each of which is incorporated herein by reference in its entirety.

Processed digital cancel path IF signal 172 is next provided as shown in FIG. 1 from DSP circuitry 122 to IF digital to analog converter (DAC) 124 which converts processed digital cancel path IF signal 172 to analog cancel path IF signal 174. Examples of suitable DAC circuitry for IF digital to analog converter (DAC) 124 include, but are not limited to, inverse sample and hold, interpolating, delta sigma, composite, etc. IF digital to analog converter (DAC) 124 then provides analog cancel path IF signal 174 to optional amplifier circuitry 126 which inversely amplifies analog cancel path IF signal 174 to match amplitude of delayed filtered RF signal 154, and outputs this inverse amplified signal as analog cancellation IF signal 176. It will be understood that amplifier circuitry 126 may be configured with pre-set values or may be configured to be programmable in real time, e.g., to compensate for cancel path and/or delay element gains or losses to properly match the amplitude of the cancellation signal 176 with delayed filtered RF signal 154 at the input of the summer 106. Analog cancellation IF signal 176 is then added to delayed filtered RF signal 154 (which may include both desired signal/s and interferer signal/s) by summer 106 to result in a modified analog input signal 156 that, at the specific sample times determined by the sample clock 190a, includes any desired signal/s plus partially or completely cancelled interferer signal/s.

Still referring to FIG. 1, modified analog input signal 156 is provided from summer 106 to signal path RF sampler circuitry 108 where it is pulse-based sampled so as to result in a sampled analog signal 158 that includes multiple folded copies of the desired signal/s as shown in FIG. 2. As shown in FIG. 1, signal path RF sampler 108 receives a sampling clock (Fs) input signal 190a at a desired sampling frequency, and that is synchronized with sampling clock (Fs) input signal 190b as previously described. Sampling clock (Fs) signal 190a determines the sampling frequency for the signal path RF sampler 108 and may be generated by sample clock circuit 128 and optional phase tuning circuitry 130 in a manner as previously described for sampling clock (Fs) signal 190b such that pulsed-based sampling performed by signal path RF sampler circuitry 108 is synchronized with pulse-based sampling performed by cancel path RF sampler circuitry 116. As such, the sample times in sampled analog signal 158 are synchronized with (i.e., the same as) the sample times in analog sample RF signal 166, with correction for any non-zero time delay T imparted by time delay circuitry 104.

As shown, sampled analog signal 158 is next provided to signal path image select filter circuitry 110 of signal path signal sampling circuitry 184 that is configured to select the desired folded signal image from the multiple folded signal copies of sampled analog signal 158, and to output the desired signal image as an analog selected sample signal 160. In this regard, signal path image select filter circuitry 110 may be, for example, a low pass filter, a bandpass filter in the baseband Nyquist zone, a bandpass filter selecting a higher Nyquist zone, etc. Analog selected sample signal 160 is then provided to signal path ADC 112 which samples the desired signal, resulting in a substantially clean digital image of the desired signal (e.g., without saturation or other problems caused by strong interference) in digital selected sample signal 162. DSP circuitry 122 may be configured to control the phase inversion rather than using an inverting amplifier in 126. Although not shown, interference cancellation may be monitored at the output of signal path ADC 112, or alternatively at any other suitable point in the signal path after signal path RF sampler circuitry 108.

Still referring to FIG. 2, signal path ADC 112 component may be provided to include a similar or different type of analog to digital conversion circuitry as does cancel path ADC component 120. For example, signal path ADC 112 may be a traditional ADC device (e.g., successive approximation ADC device, flash ADC device, sample and hold ADC device, sigma-delta ADC device, etc.), a noise shaping tunable sigma-delta. ADC device, composite ADC device, including time-interleaved, etc. Similar to cancel path ADC 120, signal path ADC 112 may be any circuitry (e.g., a single ADC device or combination of devices such as ADC device/s in combination with gain/attenuator device/s) suitable for analog to digital conversion. In such a case, signal path ADC 112 may be controlled, for example, to optimize or hone in on a desired signal, to block an interferer signal, etc. Advantages of direct RF interference cancellation (DRIC) system 100 include flexible cancellation and ease of handling of multiple interferers or time varying interferers such as wideband chirp signals.

Figure 3:
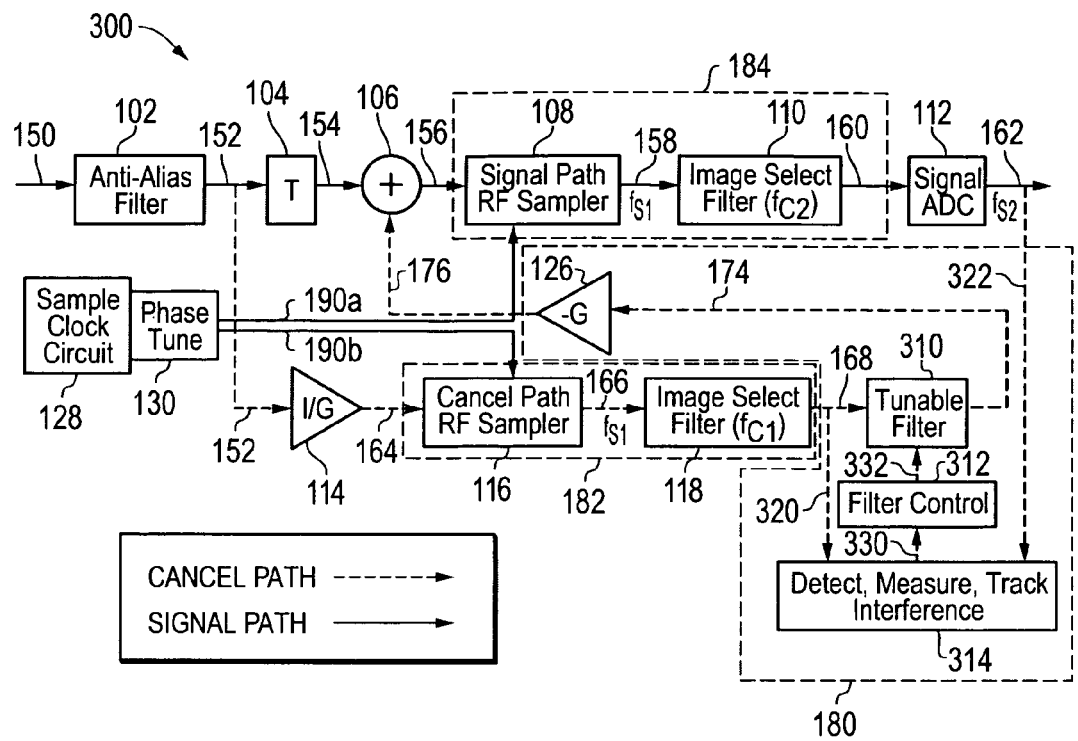
FIG. 3 is a block diagram of a direct RF interference cancellation (DRIC) system as it may be configured according to another exemplary embodiment of the disclosed systems and methods.

Referring again to FIG. 12, signal path signal sampling circuitry 184, cancel path signal sampling circuitry 182, and cancel path signal isolation circuitry 180 may be configured in different ways, with cancel path signal sampling circuitry 182 providing a selected sample IF signal 188 (which may be either digital IF signal 170 or analog IF signal 168 as appropriate to the particular embodiment) to cancel path signal isolation circuitry 180, and with signal path signal sampling circuitry 184 outputting a signal path selected sample signal 198 (which may be either analog selected sample signal 160 or digital selected sample signal 162 as appropriate to the particular embodiment). For example, in certain embodiments signal path signal sampling circuitry 184 may be configured to include signal path RF sampler 108 and image select filter 110, and cancel path signal sampling circuitry 182 may be configured to include a cancel path RF sampler 116, cancel path image select filter 118, and cancel path ADC 120 as shown in FIG. 1. In such an embodiment, cancel path signal isolation circuitry 180 may be configured to receive a digital selected sample IF signal 170 and may include DSP 122, IF DAC 124 and amplifier 126. Alternatively, cancel path signal sampling circuitry 182 may be configured to include a cancel path RF sampler 116 and a cancel path image select filter 118, i.e., with no cancel path ADC. In such an embodiment, cancel path signal isolation circuitry 180 may be configured to receive an analog selected sample IF signal 168, and may be configured to include a tunable filter 310 and amplifier 126 as shown in FIG. 3. In yet another alternative shown in FIG. 13, cancel path signal sampling circuitry 182 may be configured to include a direct RF sampling ADC 186 that may be provided as a single circuitry component that performs the functions of separate RF sampler, image select, and ADC circuitry components, i.e., with low pass filter but without separate cancel path RF sampler and cancel path image select filter components. In such an embodiment, cancel path signal isolation circuitry 180 may be configured to receive a digital selected sample IF signal 170 and may include DSP 122, IF DAC 124 and amplifier 126.

It will be understood that the various embodiments of direct RF sampler circuitry illustrated and described herein for either of the signal path or cancel path may be interchanged for use in either a signal path or cancel path of a given DRIC system embodiment as long as the appropriate type of selected sample IF signal (i.e., either digital or analog) is provided in the cancel path by the selected type of cancel path signal sampling circuitry 182 to the selected type of cancel path signal isolation circuitry 180. With that proviso, cancel path signal sampling circuitry 182 of any given DRIC system embodiment may be configured as shown in any one of FIG. 1, 3, or 13. Similarly, signal path signal sampling circuitry 184 of any given DRIC system may be configured in the same manner (with identical or similar circuitry) as cancel path signal sampling circuitry 182 is configured in any one of FIG. 1, 3, or 13. However, in some applications it may be more desirable for signal path signal sampling circuitry 184 to be configured with a direct RF sampling ADC (of the same type illustrated in cancel path of FIG. 13) when the direct RF sampling ADC is not subject to hysteresis or other memory effects. In similar manner, cancel path signal isolation circuitry 180 of any given DRIC system embodiment may be configured as shown for cancel path signal isolation circuitry 180 in either of FIG. 1 or 3, as long as it receives the appropriate type of selected sample IF signal (i.e., either digital or analog) from the corresponding cancel path signal sampling circuitry 182 of the same embodiment.

FIG. 3 illustrates an alternate embodiment of a direct RF interference cancellation (DRIC) system 300 as it may be configured according to the disclosed systems and methods. The configuration of system 300 is similar to the configuration of system 100 of FIG. 1, with the exception that cancel path ADC 120, DSP 122, and IF DAC 124 of signal isolation circuitry 180 are replaced with tunable filter circuitry 310 and associated tunable filter control circuitry 312, along with detect/measure/track interference circuitry 314 coupled to control tunable filter 310. Due to the absence of ADC, DSP and DAC in the cancel path, the architecture of the embodiment of FIG. 3 may be implemented to provide reduced power consumption and reduced cancel path latency (and hence reduced time delay requirement) as compared to the architecture of the embodiment of FIG. 1.

In the embodiment of FIG. 3, tunable filter circuitry 310 may be controlled (e.g., by tuning control signals 332 provided by filter control circuitry 312) to select an interferer signal frequency, or to block out all signals in the absence of an interferer signal. Tunable filter circuitry 310 then outputs the selected interferer signal as analog cancel path IF signal 174. As shown, optional detect/measure/track interference circuitry 314 may be further provided to analyze at least one of analog selected sample IF signal 168 (via signal path 320) and/or digital selected sample signal 162 (via signal path 322) to identify an interferer signal frequency, and to provide an interference frequency identity signal 330 (representative of the identified interferer frequency) based thereupon to filter control circuitry 312. In this regard, signal path 320 may be employed to react faster to interference without waiting for the signal path to saturate. Signal path 322 may be employed without the need for an additional ADC at the output of signal path image select filter circuitry 110, and may be employed in one exemplary embodiment in which cancel path tunable filter circuitry 310 is combined with cancel path image select filter circuitry 118. Filter control circuitry 312 in turn controls tunable filter 310 to select the interferer signal frequency for analog cancel path IF signal 174 based on interference frequency identity signal 320. Alternatively, detect/measure/track interference circuitry 314 may be absent where the frequency of interference is known apriori. Since the folded image of analog selected sample IF signal 168 is at IF instead of a much higher frequency RF, and since the range of tunable filter circuitry 310 is far smaller (only needing to cover a single Nyquist zone), the tunable filter notch may be much more tightly designed than in a conventional RF tunable notch filter implementation for handling interference.

Example circuitry that may be utilized for the tunable filter circuitry 310 includes tunable filter banks available from PARATEK. If desired, other tunable filter technologies could be utilized, such as tunable optical Mach-Zehnder filter technology, tunable image rejection notch filters, tunable bandpass filters based on active inductor technology, tunable filter that use thin film ferroelectric varactors to provide voltage controlled phase shifting, and tunable filters the use RF microelectromechanical systems (MEMS) technology.

Example circuitry for filter control circuitry 312 includes microprocessor/s. Example circuitry for detect/measure/track interference circuitry 314 includes time domain detector and frequency measure filter control, e.g., employing microprocessor for detector of interference frequency.

Figure 4:
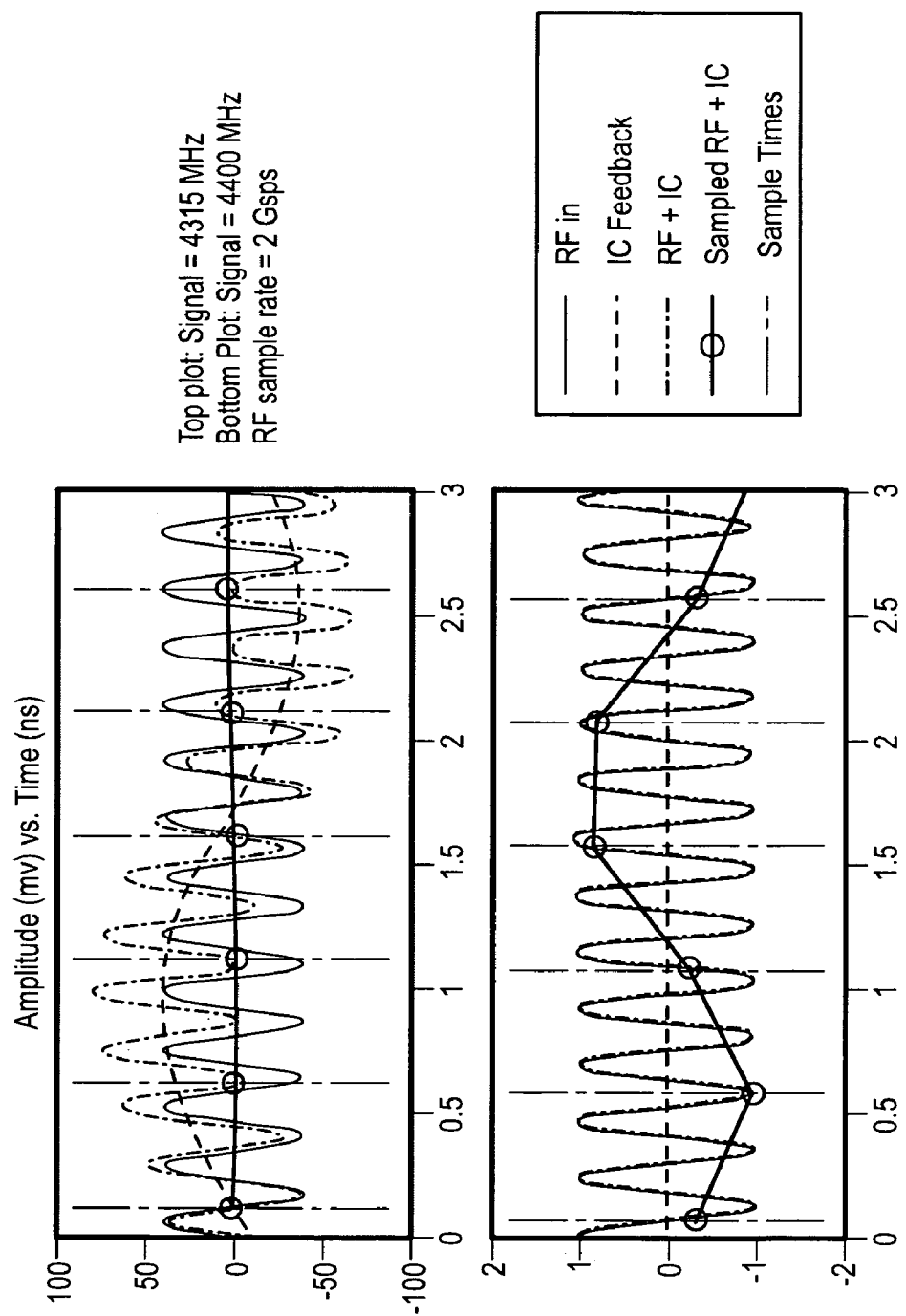
FIG. 4 shows simulation results corresponding to the direct RF interference cancellation (DRIC) system embodiment of FIG. 3.
Figure 5:
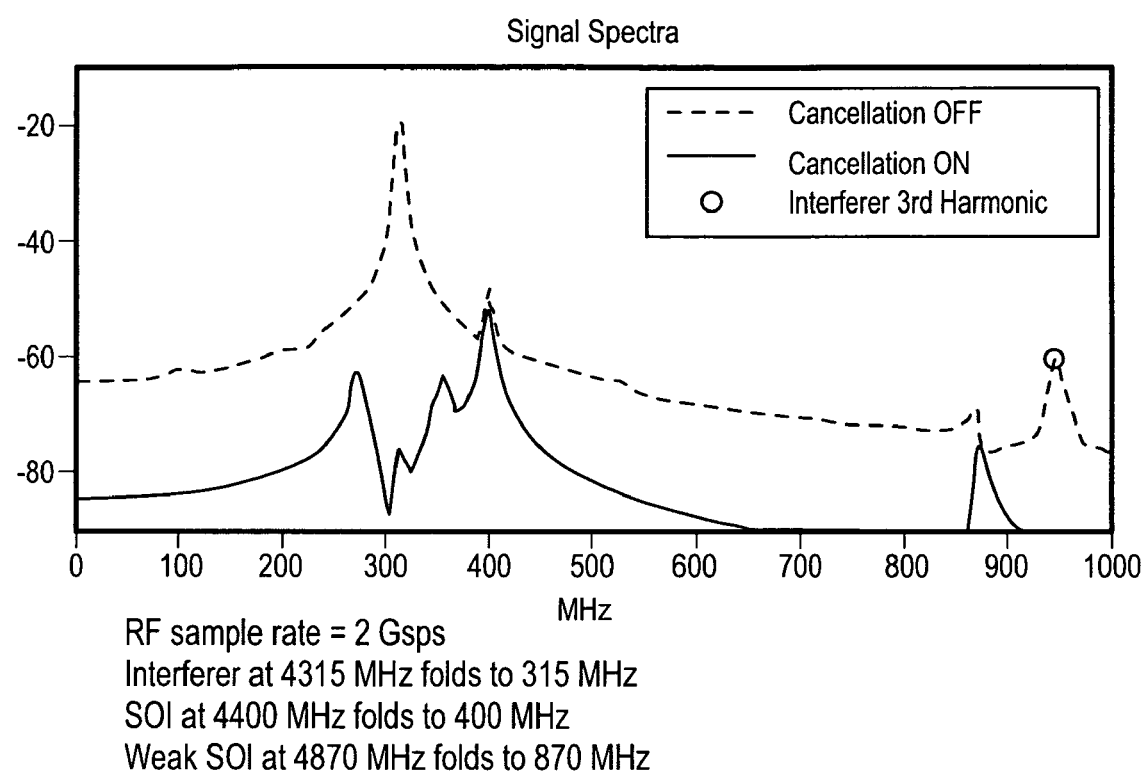
FIG. 5 shows simulation results corresponding to the direct RF interference cancellation (DRIC) system embodiment of FIG. 3.

FIGS. 4 and 5 show the results of a Simulink/Matlab simulation that corresponds approximately to the embodiment shown in FIG. 3 (with the tunable filter control performed manually rather than automatically in the Simulink simulation). FIG. 4 shows the time domain output for a case of three signals—a very strong interferer at 4315 MHz, a signal of interest (SOI) at 4400 MHz, and a very weak SOI at 4870 MHz. The RF sample rate in this simulation is 2 GHz, so that the Nyquist zone bandwidth is 1 GHz. Thus the signals fold to the range of DC to 1 GHz (for the case of a low pass interpolation or image select filter circuitry).

The top panel of FIG. 4 shows the RF interferer alone at 4315 MHz (solid line), cancel path (dashed line), RF interferer plus cancel path prior to RF sampling (dashed-dotted line), and result after signal path RF sampling (solid line with circles). Note that while the combined RF+Cancel path (green dash dot) is not always zero, it is zero at the RF sample points. The bottom panel of FIG. 4 shows a first signal of interest (SOI) at 4400 MHz (solid line), cancel path (IC) (dashed line), RF interferer plus cancel path (IC) prior to RF sampling (dashed-dotted line), and result after signal path RF Sampling (solid line with circles). Note that the cancel path is zero as expected since all signals except IF signals correspond to a narrow band about 4300 MHz are blocked by tunable filter circuitry 310 in FIG. 3. The time domain view of FIG. 4 illustrates that cancellation only needs to be achieved at the sample points when pulse-based sampling is employed, i.e., it does not matter what the signal frequency values are between the sample aperture windows. Moreover, sample points where cancellation of the RF interferer is achieved correspond to the folded IF version of the RF interferer when phase inverted.

FIG. 5 shows a frequency domain view of the same simulation as FIG. 4 with cancel path on and off. The dashed line shows signal processing results with no cancellation path, with the interferer clearly seen at 315 MHz (i.e., folded from 4315 MHz to 315 MHz). A first and stronger signal of interest SOI may be seen at 400 MHz (i.e., folded from 4400 MHz to 400 MHz). A second and weaker SOI is not readily discernable at 870 MHz (i.e., folded from 4870 MHz to 870 MHz) and is almost hidden by the third harmonic of the interferer. It should be noted that this simulation does not have any noise, and that with noise, the SOIs would be hidden. It should also be noted that the third harmonic of the interferer is a simulation artifact caused by dynamic range limitations of Simulink and that even with very small simulation time steps and high fidelity approximation, the strong SOI is distorted slightly. The solid line in FIG. 5 shows signal processing results with the cancellation path active. As shown, with the cancel path active, the interferer is heavily suppressed and the harmonic distortion from the interferer is no longer present, allowing the weaker SOI to be readily detected.

Note that in any sort of active cancellation system, the cancellation path must have enough dynamic range to handle the strong interference since the cancel signal needs to be approximately as strong as the interfering signal. Using the disclosed systems and methods, the bandwidth of the cancel path may be half of the RF sample rate (e.g., 1 GHz in the example shown in FIG. 5). This is far less total RF range than the RF input range, and achieving the high $3^{rd}$ order intercept on the IF amplifier in the cancel path is far easier than achieving a high $3^{rd}$ order intercept on a wideband RF amplifier and/or up-conversion mixer that would be required in a conventional architecture that does not use the folded IF for cancellation.

Figure 6:
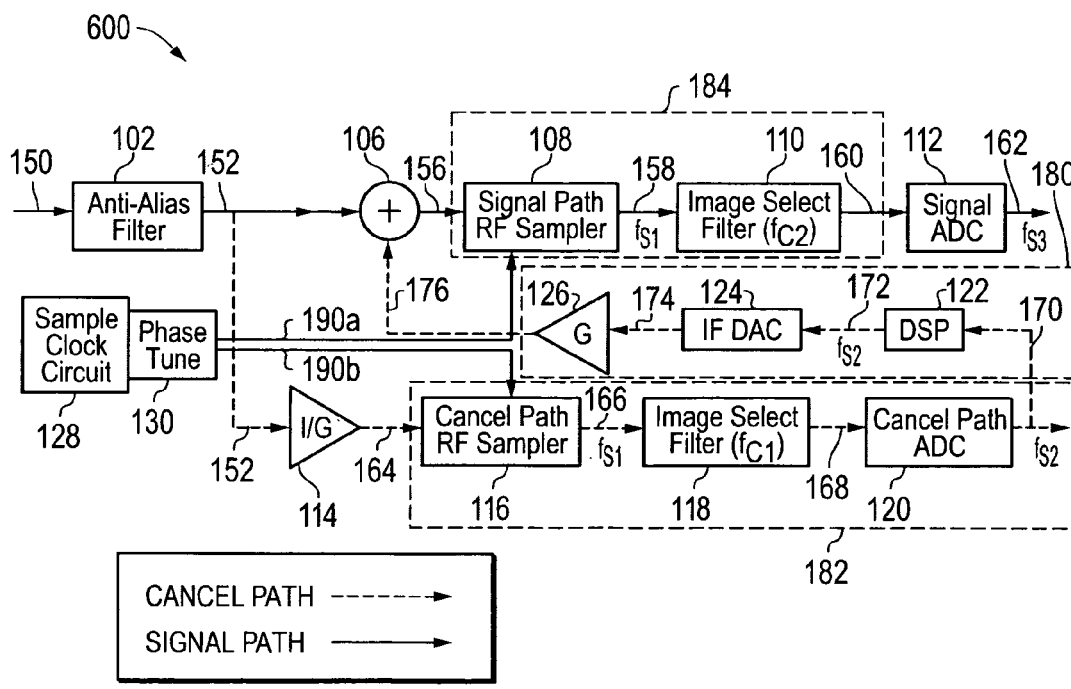
FIG. 6 is a block diagram of a direct RF interference cancellation (DRIC) system as it may be configured according to another exemplary embodiment of the disclosed systems and methods.

FIG. 6 illustrates an alternate embodiment of a direct RF interference cancellation (DRIC) system 600 as it may be configured according to the disclosed systems and methods for periodic interference cancellation such as for narrowband sinusoidal interferers. The configuration of system 600 is similar to the configuration of system 100 of FIG. 1, with the exception that there is no time delay in the signal path. In the embodiment of FIG. 6, no time delay is required because cancellation may be performed using any cycle of the interference. Because the interference is periodic, phase control (e.g., using phase tuning circuitry 130) may be employed to control pulse-based sampling of attenuated filtered RF signal 164 in order to achieve phase inversion between the cancel path and signal path sampling. In this regard, the cancel path and sample path may be sampled 180 degrees out of phase with each other (or may be sampled at the same phase and then inverted relative to each other) so that the interferer/s in the cancel path is 180 degrees out of phase with the interferer/s in filtered analog input RF signal 152, thus achieving cancellation of the interferer/s rather than requiring negating the cancellation path with amplifier circuitry 126. Thus, note that amplifier circuitry 126 is denoted by "G" rather than "–G" in FIG. 6.

Figure 7:
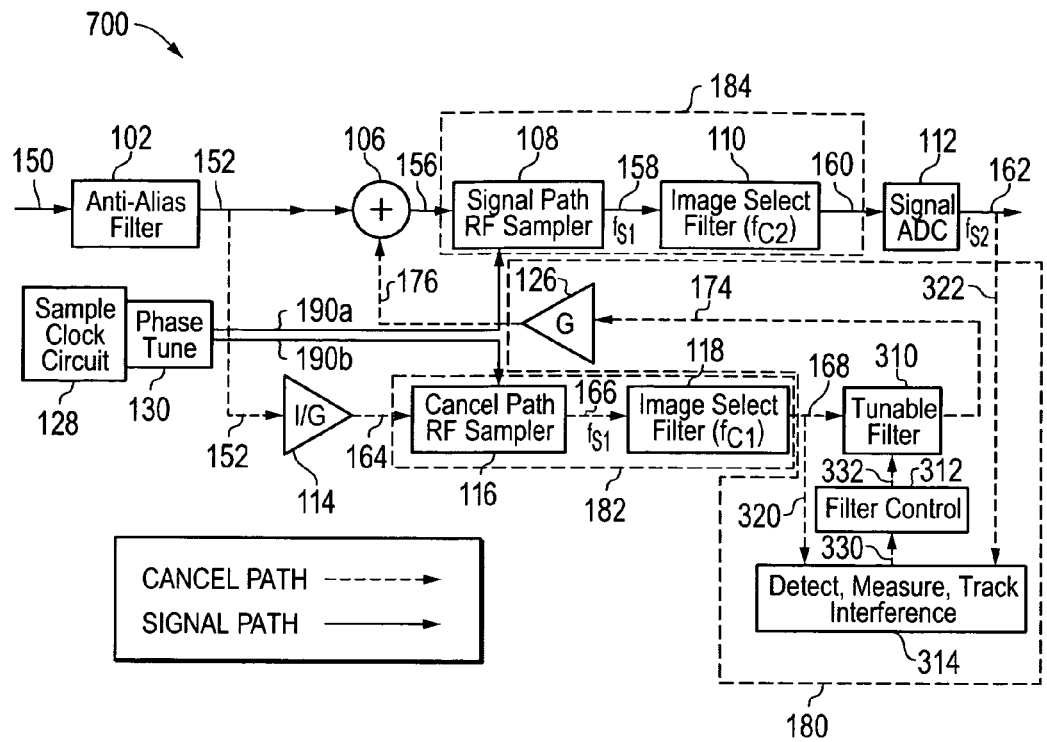
FIG. 7 is a block diagram of a direct RF interference cancellation (DRIC) system as it may be configured according to another exemplary embodiment of the disclosed systems and methods.

FIG. 7 illustrates an alternate embodiment of a direct RF interference cancellation (DRIC) system 700 as it may be configured according to the disclosed systems and methods for periodic interference cancellation. The configuration of system 300 is similar to the configuration of system 300 of FIG. 3, with the exception that there is no time delay in the signal path, for the same reason as described in relation to FIG. 6. Further, like the embodiment of FIG. 6, phase control of cancel path sampling may be employed rather than negating the cancellation path.

Figure 8:
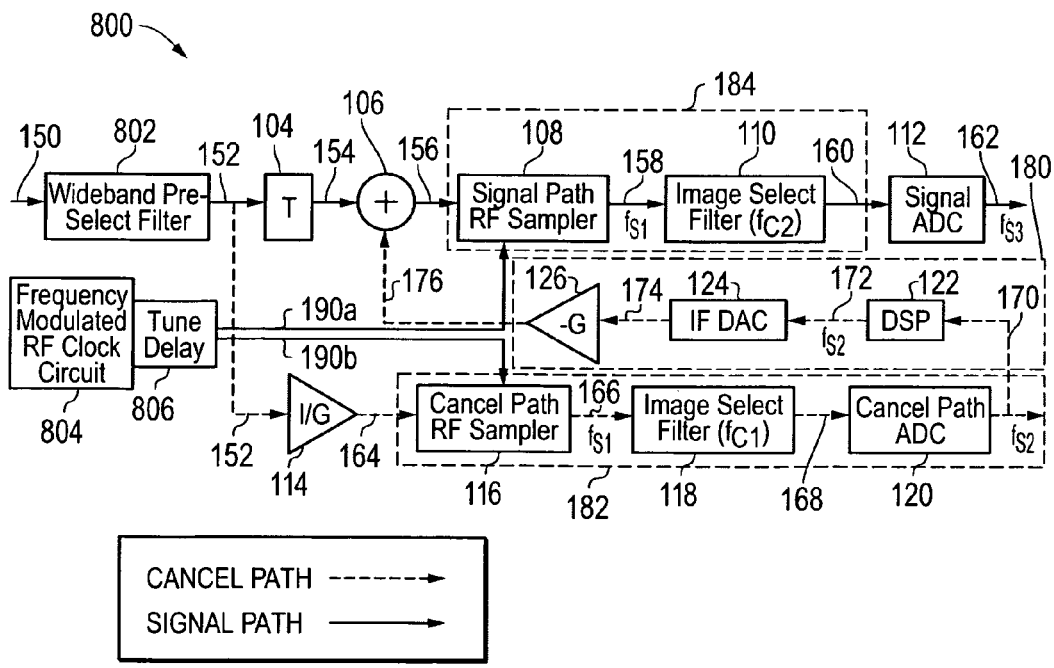
FIG. 8 is a block diagram of a Nyquist Folding RF interference cancellation (DRIC) system as it may be configured according to another exemplary embodiment of the disclosed systems and methods.

FIG. 8 illustrates an embodiment of a Nyquist Folding RF interference cancellation (DRIC) system 800 as it may be configured according to the disclosed systems and methods to utilize Nyquist folded bandpass sampling. The configuration of system 800 is similar to the configuration of system 100 of FIG. 1, with the exception that analog input RF signal 150 is first passed through wideband pre-select filter 802, and sample clock input signals 190a and 190b are generated by frequency modulated RF clock circuit 804 to control signal path sampling by signal path RF sampler 108 and cancel path sampling by cancel path RF sampler 116, respectively. In this exemplary embodiment, the wideband pre-select filter 802 may have a center frequency within a frequency range of interest and having a bandwidth less than or equal to the frequency range of interest and wide enough to cover multiple Nyquist zones, and the frequency modulated RF clock circuit 804 may be configured to provide non-uniform sampling for signals within the multiple Nyquist zones to induce frequency modulation on signals dependent on a Nyquist zone of origin.

In operation of the embodiment of FIG. 8, multiple Nyquist zones are passed through wideband preselect filter 802 and are allowed to fold on top of each other during sampling by signal path RF sampler 108 and cancel path RF sampler 116. Because the sample clock input signals 190*a* and 190*b* are modulated, separate frequency modulations can be induced within each Nyquist zone, and when the Nyquist zones fold on top of each other, the different signals from different Nyquist zones can be separated and identified based on the fact that the added modulation is different for each Nyquist zone, i.e., since sample clock input signals 190*a* and 190*b* are modulated the signals that are folded together from different Nyquist zones may be identified and distinguished. Thus, by using one or more clock modulations to induce frequency modulations that are Nyquist zone dependent (i.e., separate modulations are induced within each Nyquist zone), multiple Nyquist zones can be aliased together while still allowing for signals from different Nyquist zones to be separated and identified based on the fact that the induced modulation is different for each Nyquist zone. Because the induced modulations can be measured, a determination can be made without ambiguity of the Nyquist zone from which each signal originated.

Referring in more detail to the exemplary embodiment of FIG. 8, wideband pre-select filter 802 may be an ultra wideband (UWB) filter having a bandwidth that is wide enough to pass multiple Nyquist zones where the Nyquist zones are determined by the average RF sampling clock frequencies for the signal path RF sampler 108 and cancel path RF sampler 116. Frequency modulated RF clock circuit 804 provides sample clock input signals 190*a* and 190*b* to samplers 108 and 116, respectively that are not constant and that are adjusted or modulated during sampling. For example, the modulation may be a chirped sample clock signal, although other types of modulated clock signals could also be used depending upon the results desired (e.g., a linear sawtooth modulation, a sinusoidal modulation, a triangle modulation, a frequency shift key modulation, a frequency agile modulation, a communications frequency modulation, or a combination thereof). Other example modulated clock signals and combinations of modulations may also be used to provide non-uniform sampling including, but are not limited to, frequency shift key, frequency agile, phase shift, general frequency modulation, etc. An ability to track interference cancellation as the RF sample rate changes may be provided by monitoring the interference power level and adapting the time delay in a power minimization scheme (e.g., such as power constrained). The ability to so track cancellation as RF sample rate changes may be enhanced when the RF sample rate changes smoothly.

In one example implementation, the wideband pre-select filter circuitry 802 may be configured to have a bandwidth of about 20 GHz or more, and the modulated sample clock input signals 190*a* and 190*b* may each be generated to have an average sampling rate of about 2 GHz or more. Other implementations may be made, as desired. Further, wideband pre-select filter circuitry 802 may be tunable and or reconfigurable, e.g., in the case where wideband pre-select filter circuitry 802 selects sub-regions, it may be advantageous to tune the sub-regions to cover different areas in response to jammers or to time-varying frequency regions of interest. It is also noted that the clock modulation may be switchable or otherwise reconfigurable. For example, it may be advantageous to change the clock modulation from one type of modulation to another type of modulation in order to improve the performance against different classes of signals.

Thus, a single clock modulation, or multiple clock modulations, mathematically translate into different signal modulations depending upon the Nyquist zone in which the signals are located before being folded together thereby allowing separation of the aliased signals and determination of the Nyquist zone from which they came. It is further noted that the frequency modulated sample clock input signals may be tunable or switchable such that the center frequency of the sample clock input signals 190*a* and/or 190*b* may be tuned to a desired frequency and/or one of a plurality of generated clock signals may be selected. In addition, frequency modulated RF sampling clock 804 may be configured such that the modulation for frequency modulated RF sampling clock 804 is adjusted during operation of a receiver. Other variations and implementations could also be utilized, if desired. Further information on Nyquist folded bandpass sampling may be found in U.S. Pat. Nos. 7,436,912; and 7,436,911, each of which is incorporated herein by reference in its entirety.

Still referring to the embodiment of FIG. 8, tune delay circuitry 806 (e.g., such as employed for tunable RF delay circuitry) is provided as shown to allow delay of modulated sample clock input signal 190*a* relative to modulated sample clock input signal 190*b* (or vice versa) to account for the propagation time difference between the first signal path from output of wideband pre select filter 802 to input of signal path RF sampler 108 and the second signal path from output of wideband pre select filter 802 to input of cancel path RF sampler 116. In this regard, the tune delay 806 is employed in this embodiment to align the time-varying clocks 190*a* and 190*b* so that they sample the waveform at the same relative points in phase.

Figure 9:
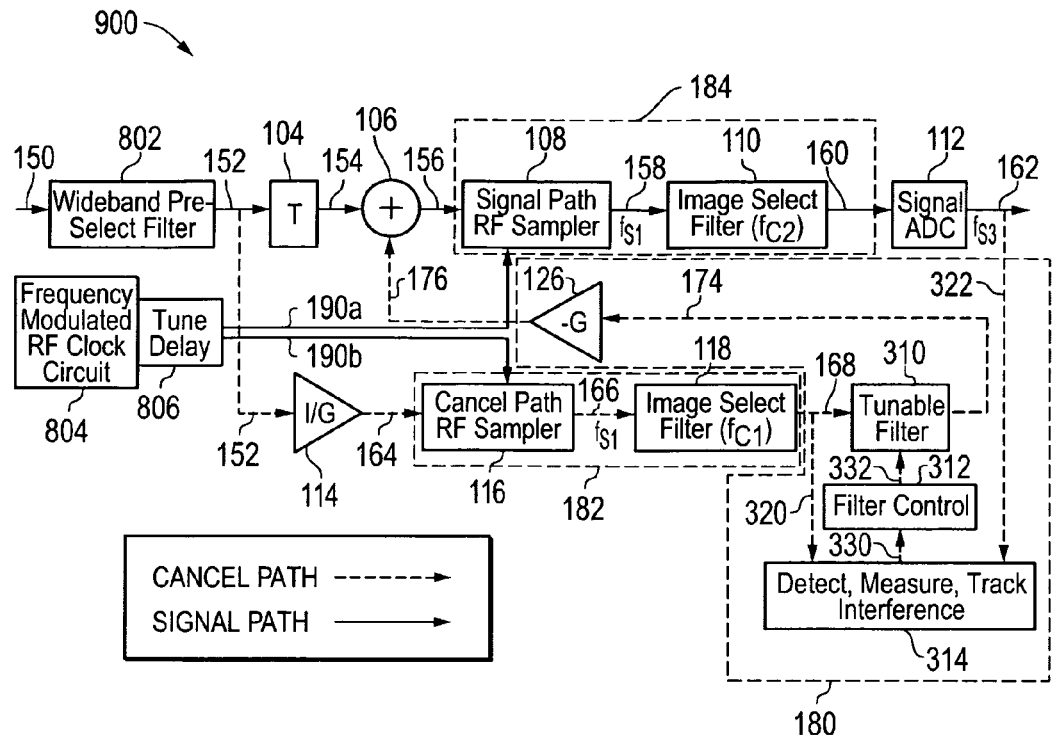
FIG. 9 is a block diagram of a Nyquist Folding RF interference cancellation (DRIC) system as it may be configured according to another exemplary embodiment of the disclosed systems and methods.

FIG. 9 illustrates another alternate embodiment of a Nyquist Folding RF interference cancellation (DRIC) system 900 as it may be configured according to the disclosed systems and methods to utilize Nyquist folded bandpass sampling. The configuration of system 900 is similar to the configuration of system 800 of FIG. 8, with the exception that cancel path ADC 120, DSP 122, and IF DAC 124 are replaced with tunable filter circuitry 310 and associated tunable filter control circuitry 312 in a manner similar to the embodiment of FIG. 3. Also, similar to the embodiment of FIG. 3, detect/measure/track interference circuitry 314 is provided and coupled to control tunable filter 310.

Figure 10:
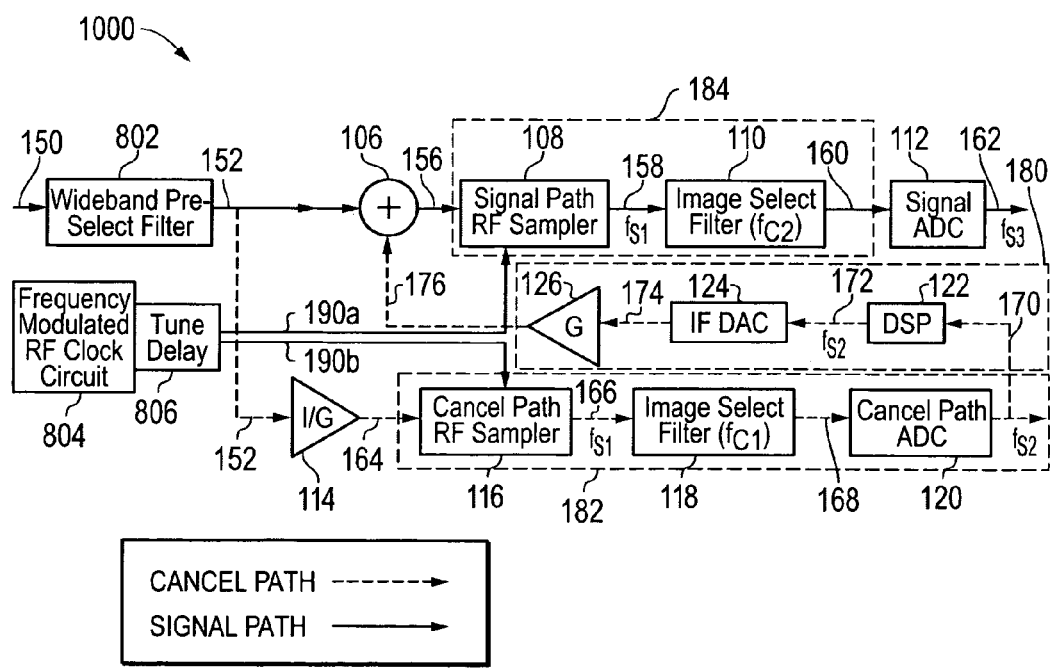
FIG. 10 is a block diagram of a Nyquist Folding RF interference cancellation (DRIC) system as it may be configured according to another exemplary embodiment of the disclosed systems and methods.

FIG. 10 illustrates another alternate embodiment of a Nyquist Folding RF interference cancellation (DRIC) system 1000 as it may be configured according to the disclosed systems and methods to utilize Nyquist folded bandpass sampling for periodic interference cancellation. The configuration of system 1000 is similar to the configuration of system 800 of FIG. 8, with the exception that there is no time delay in the signal path. In the embodiment of FIG. 10, no time delay is required because cancellation may be performed by inverting the cancellation signal within DSP 122. With regard to the Nyquist Folding RF interference cancellation embodiment of FIG. 9, inversion is not accomplished by simple time delay even for periodic interferers because the interference has an induced modulation bandwidth at the input of the tunable filter 310 and a time delay will only cancel a single frequency component (although partial cancellation may be obtained using time delay rather than full signal inversion).

Figure 11:
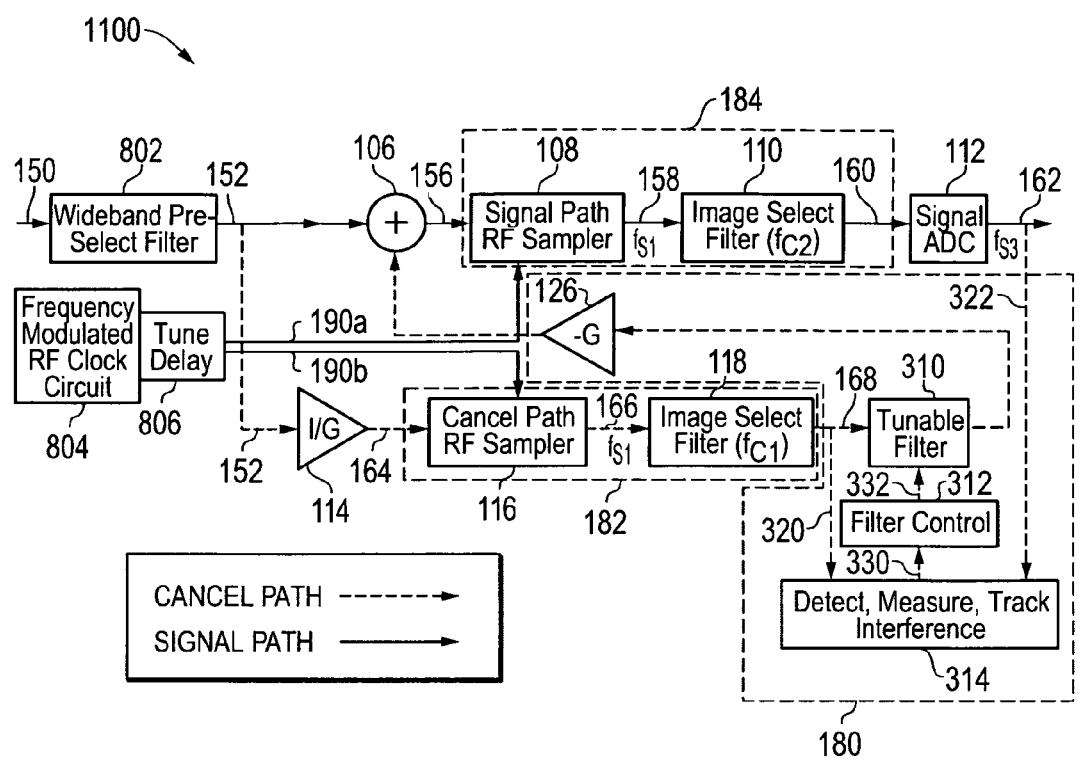
FIG. 11 is a block diagram of a Nyquist Folding RF interference cancellation (DRIC) system as it may be configured according to another exemplary embodiment of the disclosed systems and methods.

FIG. 11 illustrates another alternate embodiment of a Nyquist Folding RF interference cancellation (DRIC) system 1100 as it may be configured according to the disclosed systems and methods to utilize Nyquist folded bandpass sampling. The configuration of system 1100 is similar to the configuration of system 800 of FIG. 8, with the exception that there is no time delay in the signal path. In the embodiment of FIG. 11, the cancel path ADC 120, DSP 122, and IF DAC 124 are replaced with tunable filter circuitry 310 and associated tunable filter control circuitry 312 in a manner similar to the embodiments of FIGS. 3 and 9. Also, similar to the embodiments of FIGS. 3 and 9, detect/measure/track interference circuitry 314 is provided and coupled to control tunable filter 310.

Where it is desirable to provide amplification, it will be understood that one or more low noise amplifiers (LNAs) and/or IF amplifiers and/or narrow band filters may be employed in any of the system configurations described and illustrated herein.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An interference cancellation system configured to receive an analog input RF signal, said interference cancellation system comprising:
    cancel path circuitry comprising cancel path signal sampling circuitry and signal isolation circuitry; and
    signal path circuitry comprising signal path signal sampling circuitry;
    wherein said cancel path signal sampling circuitry is coupled to sample said analog input RF signal to produce an analog or digital cancel path selected sample IF signal, and wherein said signal isolation circuitry is coupled to receive said cancel path selected sample IF signal and to isolate a signal within said cancel path analog selected sample IF signal and to output said isolated signal as an analog cancellation IF signal having a different frequency than said analog input RF signal; and
    wherein said signal path circuitry is coupled to combine said analog input RF signal with said analog cancellation IF signal to create a modified analog input signal, wherein said signal path signal sampling circuitry is coupled to sample said modified analog input signal to produce a signal path analog or digital selected sample signal.

2. The system of claim 1, wherein said cancel path signal sampling circuitry comprises cancel path RF sampler circuitry and cancel path image select filter circuitry;
    wherein said signal path signal sampling circuitry comprises signal path RF sampler circuitry and signal path image select filter circuitry;
    wherein said cancel path RF sampler circuitry is coupled to sample said analog input RF signal to produce a cancel path sampled analog signal including multiple folded signal images of at least a portion of said analog input RF signal, wherein said cancel path image select filter circuitry is coupled to receive said cancel path analog sample RF signal and to select a desired folded signal image from said multiple folded signal copies of said cancel path analog sample RF signal, wherein said cancel path signal sampling circuitry is configured to output said selected desired signal image as said analog or digital cancel path selected sample IF signal, and wherein said signal isolation circuitry is coupled to receive said cancel path analog or digital cancel path selected sample IF signal and to isolate a signal within said cancel path analog or digital cancel path selected sample IF signal and to output said isolated signal as an analog cancellation IF signal having a different frequency than said analog input RF signal; and
    wherein said signal path circuitry is coupled to combine said analog input RF signal with said analog cancellation IF signal to create a modified analog input signal, wherein said signal path RF sampler circuitry is coupled to sample said modified analog input signal to produce a signal path sampled analog signal including multiple folded signal images of at least a portion of said modified analog input signal, and wherein said signal path image select filter circuitry is coupled to receive said signal path sampled analog signal and to select a desired folded signal image from said multiple folded signal copies of said signal path sampled analog signal and to output said selected desired signal image as a signal path analog selected sample signal.

3. The system of claim 2, wherein said analog input RF signal comprises at least one desired signal in the presence of at least one interfering signal; wherein said cancel path analog sample RF signal includes multiple folded signal images of said interfering signal and at least a portion of said desired signal; wherein said cancel path analog or digital cancel path selected sample IF signal includes a selected folded signal image of said interfering signal and at least a portion of said desired signal; wherein said analog cancellation IF signal includes said interfering signal in the absence of said desired signal and is effective to at least partially cancel said at least one interfering signal in said analog input RF signal when combined with said analog input RF signal by said signal path circuitry so as to produce said modified analog input signal; and wherein said modified analog input signal includes at least a portion of said desired signal.

4. The system of claim 3, further comprising anti-alias filter circuitry coupled to filter out one or more frequencies of said analog input RF signal prior to said signal path circuitry and said cancel path circuitry.

5. The system of claim 3, wherein said signal path circuitry further comprises time delay circuitry coupled to delay said analog input RF signal prior to combining said analog input RF signal with said analog cancellation IF signal to create said modified analog input signal, said time delay circuitry configured to delay said analog input RF signal for a period of time that is sufficient to allow said analog cancellation IF signal to be provided and combined with said analog input RF signal so as to at least partially cancel said at least one interfering signal in said analog input RF signal and produce said modified analog input signal.

6. The system of claim 3, wherein said at least one interfering signal is a periodic signal; wherein said signal path circuitry and said cancel path circuitry is configured such that said analog input RF signal is not delayed prior to combining said analog input RF signal with said analog cancellation IF signal to create said modified analog input signal; and wherein said interference cancellation circuitry further comprises phase tuning circuitry coupled to control sampling of at least one of said signal path RF sampler circuitry or said cancel path RF sampler circuitry to achieve phase inversion between said cancel path sampling and said signal path sampling such that said analog cancellation IF signal at least partially cancels said at least one interfering signal in said analog input RF signal when said analog cancellation IF signal is combined with said analog input RF signal to produce said modified analog input signal.

7. The system of claim 3, wherein said cancel path signal sampling circuitry further comprises cancel path analog to digital converter (ADC) circuitry; wherein said cancel path signal isolation circuitry comprises digital signal processing (DSP) circuitry, IF digital to analog converter (DAC) circuitry, and amplifier circuitry; wherein said cancel path ADC circuitry is coupled to produce a digital selected sample IF signal including said interfering signal and said at least a portion of said desired signal; wherein said DSP circuitry is coupled to receive said digital selected sample IF signal and to isolate said interfering signal to produce a processed digital cancel path IF signal including said interfering signal in the absence of said desired signal; wherein said IF DAC circuitry is configured to convert said processed digital cancel path IF signal to an analog cancel path IF signal; and wherein said amplifier circuitry is configured to inversely amplify said analog cancel path IF signal to substantially match an amplitude of said analog input RF signal to produce said analog cancellation IF signal.

8. The system of claim 3, wherein said cancel path RF sampler circuitry is configured to produce an analog selected sample IF signal; wherein said signal isolation circuitry comprises tunable filter circuitry and amplifier circuitry; wherein said tunable filter circuitry is coupled to receive said analog selected sample IF signal and is controlled to selectably pass said interfering signal frequency in the absence of said desired signal to produce said analog cancel path IF signal; and wherein said amplifier circuitry is configured to amplify said analog cancel path IF signal to substantially match an amplitude of said analog input RF signal to produce said analog cancellation IF signal.

9. The system of claim 3, further comprising at least one sample clock circuit coupled to synchronize said sampling performed by said signal path RF sampler circuitry with said sampling performed by said cancel path RF sampler circuitry.

10. The system of claim 3, further comprising modulated frequency clock circuitry and wideband filter circuitry; said frequency modulated RF clock circuitry coupled to control sampling by each of said signal path RF sampler circuitry and said cancel path RF sampler circuitry to provide non-uniform sampling for signals within multiple Nyquist zones to induce frequency modulation on signals dependent on a Nyquist zone of origin; and said wideband filter circuitry coupled to filter said analog input RF signal prior to said signal path circuitry and said cancel path circuitry, said wideband filter circuitry having a center frequency within a frequency range of interest and having a bandwidth less than or equal to the frequency range of interest and wide enough to cover multiple Nyquist zones associated with said modulated frequency clock.

11. The system of claim 3, further comprising signal path analog to digital converter (ADC) circuitry coupled to sample said desired signal in said signal path analog selected sample signal to produce a substantially clean digital image of said desired signal in a digital output signal.

12. The system of claim 1, wherein said cancel path signal sampling circuitry comprises direct RF sampling ADC circuitry; wherein said signal path signal sampling circuitry comprises signal path RF sampler circuitry and signal path image select filter circuitry; wherein said cancel path signal isolation circuitry comprises digital signal processing (DSP) circuitry, IF digital to analog converter (DAC) circuitry, and amplifier circuitry; wherein said cancel path direct RF sampling ADC circuitry is coupled to produce a digital selected sample IF signal including said interfering signal and said at least a portion of said desired signal; wherein said DSP circuitry is coupled to receive said digital selected sample IF signal and to isolate said interfering signal to produce a processed digital cancel path IF signal including said interfering signal in the absence of said desired signal; wherein said IF DAC circuitry is configured to convert said processed digital cancel path IF signal to an analog cancel path IF signal; and wherein said amplifier circuitry is configured to inversely amplify said analog cancel path IF signal to substantially match an amplitude of said analog input RF signal to produce said analog cancellation IF signal; and wherein said signal path is coupled to combine said analog input RF signal with said analog cancellation IF signal to create a modified analog input signal, wherein said signal path RF sampler circuitry is coupled to sample said modified analog input signal to produce a signal path sampled analog signal including multiple folded signal images of at least a portion of said modified analog input signal, and wherein said signal path image select filter circuitry is coupled to receive said signal path sampled analog signal and to select a desired folded signal image from said multiple folded signal copies of said signal path sampled analog signal and to output said selected desired signal image as a signal path analog selected sample signal.

13. A method for canceling interference in an analog input RF signal, comprising:
providing cancel path circuitry comprising cancel path signal sampling circuitry and signal isolation circuitry;
providing signal path circuitry comprising signal path signal sampling circuitry;
providing said analog input RF signal to said signal path circuitry and said cancel path circuitry;
utilizing said cancel path signal sampling circuitry to sample said analog input RF signal to produce an analog or digital cancel path selected sample IF signal;
utilizing said signal isolation circuitry to isolate a signal within said analog or digital cancel path selected sample IF signal and to output said isolated signal as an analog cancellation IF signal having a different frequency than said analog input RF signal;
combining said analog input RF signal with said analog cancellation IF signal to create a modified analog input signal; and
utilizing said signal path signal sampling circuitry to sample said modified analog input signal to produce a signal path analog or digital selected sample signal.

14. The method of claim 13, wherein said cancel path signal sampling circuitry comprises cancel path RF sampler circuitry and cancel path image select filter circuitry; wherein said signal path signal sampling circuitry comprises signal path RF sampler circuitry and signal path image select filter circuitry; and wherein said method further comprises:
providing cancel path circuitry comprising cancel path RF sampler circuitry, cancel path image select filter circuitry, and signal isolation circuitry;
providing signal path circuitry comprising signal path RF sampler circuitry and signal path image select filter circuitry;
providing said analog input RF signal to said signal path circuitry and said cancel path circuitry;
utilizing said cancel path RF sampler circuitry to sample said analog input RF signal to produce a cancel path analog sample RF signal including multiple folded signal images of at least a portion of said analog input RF signal;
utilizing said cancel path image select filter circuitry to select a desired folded signal image from said multiple folded signal copies of said cancel path analog sample RF signal and outputting said selected desired signal image from said cancel path signal sampling circuitry as said analog or digital cancel path selected sample IF signal;
utilizing said signal isolation circuitry to isolate a signal within said analog or digital cancel path selected sample IF signal and to output said isolated signal as an analog cancellation IF signal having a different frequency than said analog input RF signal;
combining said analog input RF signal with said analog cancellation IF signal to create a modified analog input signal;
utilizing said signal path RF sampler circuitry to sample said modified analog input signal to produce a signal path sampled analog signal including multiple folded signal images of at least a portion of said modified analog input signal; and
utilizing said signal path image select filter circuitry to select a desired folded signal image from said multiple folded signal copies of said signal path sampled analog signal and to output said selected desired signal image as a signal path analog selected sample signal.

15. The method of claim 14, wherein said analog input RF signal comprises at least one desired signal in the presence of at least one interfering signal; wherein said cancel path analog sample RF signal includes multiple folded signal images of said interfering signal and at least a portion of said desired signal; wherein said cancel path analog or digital cancel path selected sample IF signal includes a selected folded signal image of said interfering signal and at least a portion of said desired signal; wherein said analog cancellation IF signal includes said interfering signal in the absence of said desired signal; and wherein said method further comprises at least partially canceling said at least one interfering signal in said analog input RF signal by combining said analog cancellation IF signal with said analog input RF signal to produce said modified analog input signal, said modified analog input signal including at least a portion of said desired signal.

16. The method of claim 15, further comprising providing and utilizing anti-alias filter circuitry to filter out one or more frequencies of said analog input RF signal prior to providing said analog input RF signal to said signal path circuitry and said cancel path circuitry.

17. The method of claim 15, further comprising providing and utilizing time delay circuitry to delay said analog input RF signal prior to combining said analog input RF signal with said analog cancellation IF signal to create said modified analog, input signal, a value of said time delay being sufficient to allow said analog cancellation IF signal to be provided and combined with said analog input RF signal so as to at least partially cancel said at least one interfering signal in said analog input RF signal and produce said modified analog input signal.

18. The method of claim 15, wherein said at least one interfering signal is a periodic signal; wherein said analog input RF signal is not delayed by time delay circuitry prior to combining said analog input RF signal with said analog cancellation IF signal to create said modified analog input signal; and wherein said method further comprises providing and utilizing phase tuning circuitry to control said sampling of at least one of said signal path RF sampler circuitry or said cancel path RF sampler circuitry to achieve phase inversion between said cancel path sampling and said signal path sampling such that said analog cancellation IF signal at least partially cancels said at least one interfering signal in said analog input RF signal when said analog cancellation IF signal is combined with said analog input RF signal to produce said modified analog input signal.

19. The method of claim 15, wherein said cancel path signal sampling circuitry further comprises cancel path analog to digital converter (ADC) circuitry; wherein said cancel path signal isolation circuitry comprises digital signal processing (DSP) circuitry, IF digital to analog converter (DAC), and amplifier circuitry; and wherein said method further comprises:
utilizing said cancel path ADC circuitry to produce a digital selected sample IF signal from said analog selected sample IF signal, said digital selected sample IF signal including said interfering signal and said at least a portion of said desired signal;
utilizing said DSP circuitry to isolate said interfering signal and produce a processed digital cancel path IF signal from said digital selected sample IF signal, said processed digital cancel path IF signal including said interfering signal in the absence of said desired signal;
utilizing said IF DAC circuitry to convert said processed digital cancel path IF signal to an analog cancel path IF signal; and
utilizing said amplifier circuitry to produce said analog cancellation IF signal by inversely amplifying said analog cancel path IF signal to substantially match an amplitude of said analog input RF signal.

20. The method of claim 15, wherein said signal isolation circuitry comprises tunable filter circuitry and amplifier circuitry; and wherein said method further comprises:
utilizing said cancel path RF sampler circuitry to produce an analog selected sample IF signal;
providing said analog selected sample IF signal to said tunable filter circuitry and controlling said tunable filter circuitry to selectably pass said interfering signal frequency in the absence of said desired signal to produce said analog cancel path IF signal; and
utilizing said amplifier circuitry to produce said analog cancellation IF signal by amplifying said analog cancel path IF signal to substantially match an amplitude of said analog input RF signal.

21. The method of claim 15, further comprising providing and utilizing at least one sample clock circuit to generate sampling clock signals to synchronize said sampling performed by said signal path RF sampler circuitry with said sampling performed by said cancel path RF sampler circuitry.

22. The method of claim 15, further comprising:
providing modulated frequency clock circuitry and wideband filter circuitry;
utilizing said frequency modulated RF clock circuitry to control sampling by each of said signal path RF sampler circuitry and said cancel path RF sampler circuitry to provide non-uniform sampling for signals within multiple Nyquist zones to induce frequency modulation on signals dependent on a Nyquist zone of origin; and
utilizing said wideband filter circuitry to filter said analog input RF signal prior to providing said analog input RF signal to said signal path circuitry and said cancel path circuitry, said wideband filter circuitry having a center frequency within a frequency range of interest and having a bandwidth less than or equal to the frequency range of interest and wide enough to cover multiple Nyquist zones associated with said modulated frequency clock.

23. The method of claim 15, further comprising providing and utilizing a signal path analog, to digital converter (ADC) circuitry to sample said desired signal in said signal path analog selected sample signal to produce a substantially clean digital image of said desired signal in a digital output signal.

24. The method of claim 13, wherein said cancel path signal sampling circuitry comprises direct RF sampling ADC circuitry; wherein said cancel path signal isolation circuitry comprises digital signal processing (DSP) circuitry, IF digital to analog converter (DAC), and amplifier circuitry; and wherein said method further comprises:

utilizing said cancel path direct RF sampling ADC circuitry to produce a digital selected sample IF signal including said interfering signal and said at least a portion of said desired signal;

utilizing said DSP circuitry to isolate said interfering signal and produce a processed digital cancel path IF signal from said digital selected sample IF signal, said processed digital cancel path IF signal including said interfering signal in the absence of said desired signal;

utilizing said IF DAC circuitry to convert said processed digital cancel path IF signal to an analog cancel path IF signal; and utilizing said amplifier circuitry to produce said analog cancellation IF signal by inversely amplifying said analog cancel path IF signal to substantially match an amplitude of said analog input RF signal.

* * * * *